United States Patent
Zhang et al.

(10) Patent No.: US 12,075,273 B2
(45) Date of Patent: Aug. 27, 2024

(54) MEASUREMENT METHOD AND MEASUREMENT APPARATUS

(71) Applicant: Huawei Technologies Co., Ltd., Shenzhen (CN)

(72) Inventors: Qian Zhang, Beijing (CN); Meng Deng, Beijing (CN); Daoming Liu, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 646 days.

(21) Appl. No.: 17/133,931

(22) Filed: Dec. 24, 2020

(65) Prior Publication Data

US 2021/0120446 A1   Apr. 22, 2021

Related U.S. Application Data

(63) Continuation of application No. PCT/CN2019/093119, filed on Jun. 26, 2019.

(30) Foreign Application Priority Data

Jun. 26, 2018   (CN) .......................... 201810669604.3

(51) Int. Cl.
   *H04W 24/10*      (2009.01)
   *H04W 36/00*      (2009.01)
(52) U.S. Cl.
   CPC ....... *H04W 24/10* (2013.01); *H04W 36/0083* (2013.01)
(58) Field of Classification Search
   None
   See application file for complete search history.

(56) References Cited

U.S. PATENT DOCUMENTS 10,856,200 B2\* 12/2020 Zhang ............... H04W 36/0085
11,304,082 B2\*  4/2022 Da Silva ............. H04J 11/0069
(Continued)

FOREIGN PATENT DOCUMENTS

CN     102547879 A     7/2012
CN     103650588 A     3/2014
(Continued)

OTHER PUBLICATIONS

3GPP TS 38.331 V15.2.0 (Jun. 2018), 3rd Generation Partnership Project, Technical Specification Group Radio Access Network, NR, Radio Resource Control (RRC) protocol specification (Release 15), 304 pages.

(Continued)

*Primary Examiner* — Faiyazkhan Ghafoerkhan
(74) *Attorney, Agent, or Firm* — Slater Matsil, LLP

(57) ABSTRACT

This application provides a measurement method and a measurement apparatus. The measurement method includes: adding, by a network device, information about one frequency band or a plurality of frequency bands to measurement configuration information delivered to a terminal device; determining, by the terminal device, a corresponding radio frequency link channel configuration parameter by using the information about the one frequency band or the plurality of frequency bands; and measuring, by the terminal device, a measurement object based on the radio frequency link channel configuration parameter, and reporting a measurement result to the network device.

22 Claims, 10 Drawing Sheets

(56) References Cited

U.S. PATENT DOCUMENTS

| | | | |
|---|---|---|---|
| 2008/0186919 A1* | 8/2008 | Huang | H04W 36/0088 370/331 |
| 2011/0098046 A1* | 4/2011 | Shin | H04W 48/16 455/436 |
| 2013/0242796 A1* | 9/2013 | Chen | H04L 5/001 370/252 |
| 2014/0087715 A1* | 3/2014 | Suzuki | H04W 24/10 455/422.1 |
| 2014/0334371 A1* | 11/2014 | Kim | H04W 8/24 370/311 |
| 2014/0341116 A1* | 11/2014 | Chen | H04W 8/24 370/328 |
| 2015/0156695 A1* | 6/2015 | Zhang | H04W 76/15 455/437 |
| 2016/0050605 A1* | 2/2016 | Kim | H04W 28/0278 370/331 |
| 2016/0234773 A1* | 8/2016 | Choi | H04W 52/0206 |
| 2016/0262118 A1* | 9/2016 | Kim | H04L 5/001 |
| 2016/0278004 A1* | 9/2016 | Agyapong | H04W 24/10 |
| 2016/0360479 A1* | 12/2016 | Kim | H04W 52/0229 |
| 2018/0020383 A1* | 1/2018 | Sirotkin | H04W 48/18 |
| 2018/0027471 A1* | 1/2018 | Zhang | H04W 36/0085 455/436 |
| 2018/0084465 A1* | 3/2018 | Jung | H04W 8/005 |
| 2018/0092085 A1* | 3/2018 | Shaheen | H04W 36/14 |
| 2018/0192426 A1* | 7/2018 | Ryoo | H04W 36/0055 |
| 2018/0220458 A1* | 8/2018 | Ouchi | H04L 27/01 |
| 2018/0227805 A1* | 8/2018 | Jang | H04W 36/0055 |
| 2018/0227823 A1* | 8/2018 | Zhang | H04L 5/001 |
| 2018/0234136 A1* | 8/2018 | Marinier | H04B 7/024 |
| 2018/0255473 A1* | 9/2018 | Kim | H04W 24/10 |
| 2018/0352459 A1* | 12/2018 | Ku | H04W 36/0088 |
| 2018/0359149 A1* | 12/2018 | Shaheen | H04W 72/0453 |
| 2019/0098571 A1* | 3/2019 | Kim | H04W 36/0088 |
| 2019/0306739 A1* | 10/2019 | Kim | H04L 5/0057 |
| 2019/0357175 A1* | 11/2019 | Höglund | H04W 76/27 |
| 2020/0120521 A1* | 4/2020 | da Silva | H04L 5/0048 |
| 2020/0313832 A1* | 10/2020 | Kim | H04L 5/0098 |
| 2020/0314946 A1* | 10/2020 | Tsuboi | H04W 24/10 |
| 2020/0374727 A1* | 11/2020 | Da Silva | H04W 24/10 |
| 2020/0412432 A1* | 12/2020 | Da Silva | H04W 56/001 |
| 2021/0120446 A1* | 4/2021 | Zhang | H04W 36/0094 |
| 2022/0210684 A1* | 6/2022 | Da Silva | H04W 76/27 |
| 2023/0284120 A1* | 9/2023 | Amuru | H04L 5/001 370/329 |

FOREIGN PATENT DOCUMENTS

| | | |
|---|---|---|
| CN | 105191424 A | 12/2015 |
| CN | 106454972 A | 2/2017 |
| CN | 107580348 A | 1/2018 |
| CN | 107637150 A | 1/2018 |
| CN | 110999376 A | 4/2020 |
| EP | 2942999 A1 | 11/2015 |
| IN | 201747033185 A | 9/2017 |
| WO | 2016142121 A1 | 9/2016 |

OTHER PUBLICATIONS

3GPP TS 36.331 V15.2.1 (Jun. 2018), 3rd Generation Partnership Project; Technical Specification Group Radio Access Network, Evolved Universal Terrestrial Radio Acess (E-UTRA); Radio Resource Control (RRC), Protocol specification (Release 15), 791 pages.

ZTE, "Discussion on Cell information exchange related to wideband carrier", 3GPP TSG RAN WG3#100, R3-182809, Busan, South Korea, May 21-25, 2018, 5 pages.

3GPP TS 38.101-1 V15.1.0 (Mar. 2018), 3rd Generation Partnership Project, Technical Specification Group Radio Access Network, NR, User Equipment (UE) radio transmission and reception, Part 1: Range 1 Standalone (Release 15), 71 pages.

Ericsson, "X2AP CR for support of NR Multiple frequency band in EN-DC", 3GPP TSG-RAN3 Meeting #100, R3-183244, Busan, Korean, May 21-25, 2018, 8 pages.

3GPP TS 38.211 V15.1.0 (Mar. 2018), 3rd Generation Partnership Project, Technical Specification Group Radio Access Network, NR, Physical channels and modulation (Release 15), 90 pages.

Huawei et al., "SSB information correction in XnAP", 3GPP TSG-RAN3 Meeting #100, R3-183534, Busan, Korea, May 21-25, 2018, 6 pages.

3GPP TS 38.213 V15.1.0 (Mar. 2018), 3rd Generation Partnership Project, Technical Specification Group Radio Access Network, NR, Physical layer procedures for control (Release 15), 77 pages.

Ericsson et al., "X2AP CR for support of NR Multiple frequency band in EN-DC", 3GPP TSG-RAN3 Meeting #100, R3-183568, Busan, Korea, May 21-25, 2018, 25 pages.

3GPP TS 38.306 V15.2.0 (Jun. 2018), 3rd Generation Partnership Project; Technical Specification Group Radio Access Network, NR, User Equipment (UE) radio access capabilities (Release 15), 28 pages.

3GPP TS 38.331 V15.2.1 (Jun. 2018), 3rd Generation Partnership Project; Technical Specification Group Radio Access Network, NR, Radio Resource Control (RRC) protocol specification (Release 15), 303 pages.

Huawei et al., "Alignment between handover command and measurement object", 3GPP TSG-RAN WG4 Meeting AH#1807, R4-1808971, Montreal, Canada, Jul. 2-6, 2018, 3 pages.

Huawei et al., "Alignment between handover command and measurement object", 3GPP TSG-RAN WG4 Meeting #88, R4-1811213, Gothenburg, Sweden, Aug. 20-24, 2018, 3 pages.

New Postcom, "Measurement configuration for multiple frequency bands", 3GPP TSG RAN WG2 Meeting #81, R2-130382, St. Julians, Malta, Jan. 28-Feb. 1, 2013, 2 pages.

Nokia et al., "Measurement Configuration in NR with BWP, RRM and beams", 3GPP TSG-RAN WG2 #99bis, R2-1711063, Prague, Czech Republic, Oct. 9-13, 2017, 4 pages.

* cited by examiner

MEASUREMENT METHOD AND MEASUREMENT APPARATUS

CROSS-REFERENCE TO RELATED APPLICATIONS

This application is a continuation of International Application No. PCT/CN2019/093119, filed on Jun. 26, 2019, which claims priority to Chinese Patent Application 201810669604.3, filed on Jun. 26, 2018. The disclosures of the aforementioned applications are hereby incorporated by reference in their entireties.

TECHNICAL FIELD

This application relates to the communications field, and more specifically, to a measurement method and a measurement apparatus.

BACKGROUND

A mobile communications system needs to meet mobile experience of a user, and implement service continuity of a terminal device when the terminal device moves. The terminal device not only needs to maintain stable communication with a serving cell, but also needs to detect a status of a neighboring cell in real time. Mobility management in a connected mode includes measurement configuration, measurement execution, measurement reporting, event triggering, and/or handover decision of the neighboring cell. How to perform measurement in a proper cell, and measurement precision, a measurement period, and the like greatly affect final performance of the mobility management.

In a new radio (NR) technology, after a terminal device enters a connected mode, a network device sends measurement configuration information of a neighboring cell to the terminal device. Only an absolute radio-frequency channel number (ARFCN) is delivered in the measurement configuration information of the neighboring cell. The terminal device determines a correspondence between the ARFCN and a frequency band number and selects a frequency band. The terminal device randomly selects a frequency band corresponding to the ARFCN for measurement and performs measurement reporting. If the network device determines to hand over the terminal device, the network device delivers a unique frequency band indication to the terminal device in handover (HO) signaling. This frequency band is determined by using an implementation algorithm of the network device.

In the NR, one ARFCN may correspond to a plurality of frequency bands, and measurement values measured by the terminal device on a radio frequency (RF) link corresponding to different frequency bands are different. This may result in inaccurate measurement precision of the terminal device, and further result in incorrect handover or a handover failure of the terminal device.

SUMMARY

In view of this, this application provides a measurement method and a measurement apparatus, to ensure measurement precision of a terminal device.

According to a first aspect, a measurement method is provided. The measurement method includes: receiving, by a terminal device, measurement configuration information sent by a network device, where the measurement configuration information includes at least an absolute radio-frequency channel number of a measurement object and information that is of the measurement object and that is about one frequency band or a plurality of frequency bands; determining, by the terminal device, a radio frequency link channel configuration parameter corresponding to a first frequency band, where the first frequency band is the one frequency band or the plurality of frequency bands, or the first frequency band is one of the plurality of frequency bands; measuring, by the terminal device based on the radio frequency link channel configuration parameter, the measurement object at a frequency location corresponding to the absolute radio-frequency channel number; and sending, by the terminal device, a measurement result of the measurement object to the network device.

In some possible implementations, the measurement configuration information includes measurement object information, a reporting configuration, a measurement interval configuration, and the like. The measurement object information includes the absolute radio-frequency channel number of the measurement object and the information that is of the measurement object and that is about the one frequency band or the plurality of frequency bands. According to the measurement method in this embodiment of this application, the network device delivers the information about the one frequency band or the plurality of frequency bands in the measurement configuration information. This helps increase measurement precision of the terminal device, and helps avoid incorrect handover or a handover failure of the terminal device.

With reference to the first aspect, in some possible implementations of the first aspect, the first frequency band is a primary frequency band of the network device, or the first frequency band is one of extended supported frequency bands of the network device.

According to the measurement method in this embodiment of this application, the network device delivers information about a unique frequency band in the measurement configuration information. This helps avoid incorrect handover or a handover failure of the terminal device while ensuring measurement precision.

With reference to the first aspect, in some possible implementations of the first aspect, when the first frequency band is one of the plurality of frequency bands, and before the determining, by the terminal device, a radio frequency link channel configuration parameter corresponding to a first frequency band, the method further includes: determining, by the terminal device, the first frequency band from the plurality of frequency bands.

In some possible implementations, the determining, by the terminal device, the first frequency band from the plurality of frequency bands includes: selecting, by the terminal device, the first frequency band from the plurality of frequency bands based on a hardware capability of the terminal device.

In some possible implementations, the determining, by the terminal device, the first frequency band from the plurality of frequency bands includes: determining, by the terminal device, a frequency band that is of the plurality of frequency bands and that is the same as that of a serving cell as the first frequency band; or determining, by the terminal device as the first frequency band, a frequency band corresponding to a radio frequency link channel with best noise figure performance in a plurality of radio frequency link channels, where the plurality of frequency bands correspond to the plurality of radio frequency link channels.

According to the measurement method in this embodiment of this application, the network device delivers the information about the plurality of frequency bands in the measurement configuration information. This helps increase the measurement precision of the terminal device, and helps avoid incorrect handover or a handover failure of the terminal device.

With reference to the first aspect, in some possible implementations of the first aspect, before the receiving, by a terminal device, measurement configuration information sent by a network device, the method further includes: sending, by the terminal device to the network device, information about a frequency band supported by the terminal device, where the frequency band supported by the terminal device includes the one frequency band or the plurality of frequency bands.

According to a second aspect, a measurement method is provided. The measurement method includes: determining, by a network device, one frequency band or a plurality of frequency bands; sending, by the network device, measurement configuration information to a terminal device, where the measurement configuration information includes at least an absolute radio-frequency channel number of a measurement object and information that is of the measurement object and that is about the one frequency band or the plurality of frequency bands; and receiving, by the network device, a measurement result sent by the terminal device.

In some possible implementations, the measurement result is a measurement result obtained by the terminal device by measuring the measurement object based on a radio frequency link channel configuration parameter corresponding to a first frequency band, and the one frequency band or the plurality of frequency bands includes/include the first frequency band.

In some possible implementations, the measurement configuration information includes measurement object information, a reporting configuration, a measurement interval configuration, and the like. The measurement object information includes the absolute radio-frequency channel number of the measurement object and the information that is of the measurement object and that is about the one frequency band or the plurality of frequency bands. According to the measurement method in this embodiment of this application, the network device delivers the information about the one frequency band or the plurality of frequency bands in the measurement configuration information. This helps increase measurement precision of the terminal device, and helps avoid incorrect handover or a handover failure of the terminal device.

With reference to the second aspect, in some possible implementations of the second aspect, before the determining, by a network device, one frequency band or a plurality of frequency bands, the method further includes: receiving, by the network device, information about a frequency band supported by the terminal device; and the determining, by a network device, one frequency band or a plurality of frequency bands includes: determining the one frequency band or the plurality of frequency bands based on the frequency band supported by the terminal device and a frequency band to which a carrier currently deployed by the network device belongs.

According to the measurement method in this embodiment of this application, the network device determines the one frequency band or the plurality of frequency bands based on a capability of the terminal device, and delivers the information about the one frequency band or the plurality of frequency bands in the measurement configuration information. This helps increase measurement precision of the terminal device, and helps avoid incorrect handover or a handover failure of the terminal device.

With reference to the second aspect, in some possible implementations of the second aspect, the one frequency band or the plurality of frequency bands is/are an intersection set of the frequency band supported by the terminal device and the frequency band to which the carrier currently deployed by the network device belongs.

With reference to the second aspect, in some possible implementations of the second aspect, the one frequency band or one of the plurality of frequency bands is the first frequency band, and the first frequency band is a primary frequency band of the network device, or the first frequency band is one of extended supported frequency bands of the network device.

According to the measurement method in this embodiment of this application, the network device delivers information about a unique frequency band in the measurement configuration information. This helps avoid incorrect handover or a handover failure of the terminal device while ensuring measurement precision.

According to a third aspect, a measurement method is provided. The method includes: receiving, by a terminal device, measurement configuration information sent by a network device, where the measurement configuration information includes at least an absolute radio-frequency channel number of a measurement object; determining, by the terminal device, a radio frequency link channel configuration parameter corresponding to each of a plurality of frequency bands, where each of the plurality of frequency bands includes a frequency location corresponding to the absolute radio-frequency channel number; measuring, by the terminal device based on the radio frequency link channel configuration parameter corresponding to each of the plurality of frequency bands, the measurement object at the frequency location corresponding to the absolute radio-frequency channel number, to obtain a plurality of measurement results, where each of the plurality of measurement results includes at least information about a frequency band corresponding to the measurement result; and sending, by the terminal device, the plurality of measurement results to the network device.

According to the measurement method in this embodiment of this application, the terminal device sends the plurality of measurement results to the network device during measurement reporting, and each measurement result carries the information about the frequency band. This helps the network device make a proper handover decision, and helps avoid incorrect handover or a handover failure of the terminal device.

With reference to the third aspect, in some possible implementations of the third aspect, the measurement configuration information further includes information about the plurality of frequency bands, and before the receiving, by a terminal device, measurement configuration information sent by a network device, the method further includes: sending, by the terminal device to the network device, information about frequency bands supported by the terminal device, where the frequency bands supported by the terminal device include the plurality of frequency bands.

According to the measurement method in this embodiment of this application, the network device determines the plurality of frequency bands based on a capability of the terminal device, and delivers the information about the plurality of frequency bands to the terminal device in the measurement configuration information. This helps the terminal device reduce a quantity of measurements.

With reference to the third aspect, in some possible implementations of the third aspect, the plurality of frequency bands include a primary supported frequency band of the network device and/or an extended supported frequency band of the network device.

In some possible implementations, the method further includes: receiving, by a terminal device, measurement configuration information sent by a network device, where the measurement configuration information includes at least an absolute radio-frequency channel number of a measurement object, and the absolute radio-frequency channel number corresponds to a plurality of frequency bands; determining, by the terminal device, a radio frequency link channel configuration parameter corresponding to a first frequency band, where the first frequency band is one of the plurality of frequency bands; measuring, by the terminal device based on the radio frequency link channel configuration parameter, the measurement object at a frequency location corresponding to the absolute radio-frequency channel number, to obtain a measurement result, where the measurement result includes at least information about the first frequency band; and sending, by the terminal device, the measurement result to the network device.

According to the measurement method in this embodiment of this application, the terminal device sends one measurement result to the network device during measurement reporting, and the measurement result carries information about a frequency band. This helps the network device make a proper handover decision, and helps avoid incorrect handover or a handover failure of the terminal device.

According to a fourth aspect, a measurement method is provided. The method includes: sending, by a network device, measurement configuration information to a terminal device, where the measurement configuration information includes at least an absolute radio-frequency channel number of a measurement object; and receiving, by the network device, a plurality of measurement results sent by the terminal device, where each of the plurality of measurement results includes at least information about a frequency band corresponding to the measurement result.

In some possible implementations, the plurality of measurement results are measurement results obtained by the terminal device by measuring the measurement object based on a radio frequency link channel configuration parameter corresponding to each of a plurality of frequency bands, and each of the plurality of frequency bands includes a frequency location corresponding to the absolute radio-frequency channel number.

According to the measurement method in this embodiment of this application, the terminal device sends the plurality of measurement results to the network device during measurement reporting, and each measurement result carries the information about the frequency band. This helps the network device make a proper handover decision, and helps avoid incorrect handover or a handover failure of the terminal device.

With reference to the fourth aspect, in some possible implementations of the fourth aspect, the measurement configuration information further includes information about the plurality of frequency bands, and before the sending, by a network device, measurement configuration information to a terminal device, the method further includes: receiving, by the network device, information about a frequency band supported by the terminal device; and determining the plurality of frequency bands based on the frequency band supported by the terminal device and a frequency band to which a carrier currently deployed by the network device belongs.

With reference to the fourth aspect, in some possible implementations of the fourth aspect, the method further includes: determining, by the network device based on a first measurement result, to hand over the terminal device; and sending a handover command to the terminal device, where the handover command includes information about a primary supported frequency band of the network device, the plurality of measurement results include the first measurement result, and a frequency band corresponding to the first measurement result is the primary supported frequency band of the network device.

With reference to the fourth aspect, in some possible implementations of the fourth aspect, the method further includes: determining, by the network device based on a first measurement result, to hand over the terminal device; and sending a handover command to the terminal device, where the handover command includes information about a frequency band corresponding to the first measurement result, and the first measurement result is a best measurement result in the plurality of measurement results.

According to the measurement method in this embodiment of this application, the network device determines the plurality of frequency bands based on a capability of the terminal device, and delivers the information about the plurality of frequency bands to the terminal device in the measurement configuration information. This helps the terminal device reduce a quantity of measurements.

With reference to the fourth aspect, in some possible implementations of the fourth aspect, the plurality of frequency bands include a primary supported frequency band of the network device and/or an extended supported frequency band of the network device.

In some possible implementations, the method further includes: sending, by a network device, measurement configuration information to a terminal device, where the measurement configuration information includes at least an absolute radio-frequency channel number of a measurement object, and the absolute radio-frequency channel number corresponds to a plurality of frequency bands; and receiving, by the network device, a measurement result sent by the terminal device, where the measurement result includes at least information about a first frequency band.

In some possible implementations, the measurement result is a measurement result obtained by the terminal device by measuring the measurement object based on a radio frequency link channel configuration parameter corresponding to a first frequency band, and the first frequency band is one of the plurality of frequency bands.

According to the measurement method in this embodiment of this application, the terminal device sends one measurement result to the network device during measurement reporting, and the measurement result carries information about a frequency band. This helps the network device make a proper handover decision, and helps avoid incorrect handover or a handover failure of the terminal device.

According to a fifth aspect, a terminal device is provided. The terminal device has functions of implementing the terminal device in the method designs of the first aspect and the third aspect. These functions may be implemented by hardware, or may be implemented by hardware executing corresponding software. The hardware or the software includes one or more units corresponding to the foregoing functions.

According to a sixth aspect, a network device is provided. The network device has functions of implementing the network device (for example, a base station) in the method designs of the second aspect and the fourth aspect. These functions may be implemented by hardware, or may be implemented by hardware executing corresponding software. The hardware or the software includes one or more units corresponding to the foregoing functions.

According to a seventh aspect, a terminal device is provided, including a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method in any one of the first aspect, the third aspect, and the possible implementations of the first aspect and the third aspect.

According to an eighth aspect, a network device is provided, including a transceiver and a processor. Optionally, the network device further includes a memory. The processor is configured to control the transceiver to send and receive a signal. The memory is configured to store a computer program. The processor is configured to invoke the computer program from the memory and run the computer program, to enable the network device to perform the method in any one of the second aspect, the fourth aspect, and the possible implementations of the second aspect and the fourth aspect.

According to a ninth aspect, a communications system is provided. The system includes the terminal device in the fifth aspect and the network device in the sixth aspect. Alternatively, the system includes the terminal device in the seventh aspect and the network device in the eighth aspect.

According to a tenth aspect, a communications apparatus is provided. The communications apparatus may be the terminal device in the foregoing method designs or a chip disposed in the terminal device. The communications apparatus includes a processor. The processor is coupled to a memory and may be configured to execute an instruction in the memory, to implement the method performed by the terminal device in any one of the first aspect, the third aspect, and the possible implementations of the first aspect and the third aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to an eleventh aspect, a communications apparatus is provided. The communications apparatus may be the network device in the foregoing method designs or a chip disposed in the network device. The communications apparatus includes a processor. The processor is coupled to a memory and may be configured to execute an instruction in the memory, to implement the method performed by the network device in any one of the second aspect, the fourth aspect, and the possible implementations of the second aspect and the fourth aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a twelfth aspect, a computer program product is provided. The computer program product includes computer program code, and when the computer program code is run on a computer, the computer is enabled to perform the methods in the foregoing aspects.

According to a thirteenth aspect, a computer-readable storage medium is provided. The computer-readable storage medium stores program code, and when the computer program code is run on a computer, the computer is enabled to perform the methods in the foregoing aspects.

DETAILED DESCRIPTION OF ILLUSTRATIVE EMBODIMENTS

Figure 1:
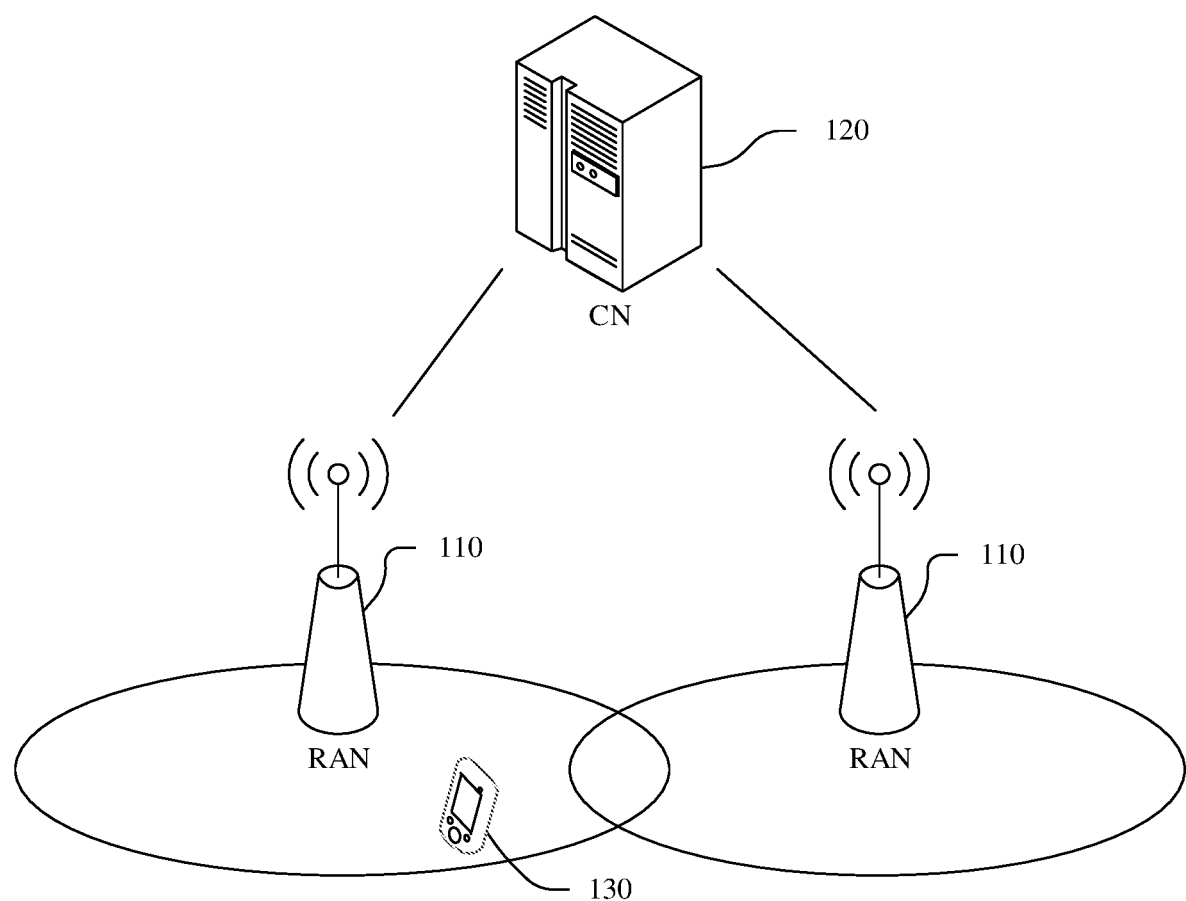
FIG. 1 is a schematic diagram of a communications system according to an embodiment of this application.

The following describes technical solutions of this application with reference to accompanying drawings.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or new radio (NR).

A terminal device in the embodiments of this application may be user equipment, an access terminal device, a subscriber unit, a subscriber station, a mobile station, a mobile console, a remote station, a remote terminal device, a mobile device, a user terminal device, a wireless communications device, a user agent, or a user apparatus. Alternatively, a terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA), a NodeB (NB) in the wideband code division multiple access (WCDMA) system, an evolved NodeB (eNB or eNodeB) in the LTE system, or a radio controller in a scenario of a cloud radio access network (CRAN). Alternatively, the network device may be a relay station, an access point, a vehicle-mounted device, a wearable device, a network device in the future 5G network, a network device in the future evolved PLMN, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). An operating system may be any one type of computer operating system or a plurality of types of computer operating systems that process services by using a process, for example, a Linux operating system, a Unix operating system, an Android operating system, an iOS operating system, or a windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, various aspects or features of this application may be implemented as a method, an apparatus or a product that uses standard programming and/or engineering technologies. The term "product" used in this application covers a computer program that can be accessed from any computer-readable component, carrier or medium. For example, a computer-readable storage medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or bear an instruction and/or data.

FIG. 1 is a schematic diagram of a communications system 100 according to an embodiment of this application. As shown in FIG. 1, a terminal device 130 accesses a wireless network, to obtain a service of an external network (for example, the internet) by using the wireless network, or communicate with another terminal device by using the wireless network. The wireless network includes a RAN no and a core network (CN) 120. The RAN no is used to access the terminal device 130 to the wireless network, and the CN 120 is used to manage the terminal device and provide a gateway for communicating with the external network.

It should be understood that a communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 130 shown in FIG. 1, or may be a chip disposed in the terminal device 130. The other communications apparatus of the two communications apparatuses may correspond to the RAN 110 shown in FIG. 1, or may be a chip disposed in the RAN 110.

Without losing generality, the following describes the embodiments of this application in detail by using an interaction process between the terminal device and the network device as an example. It may be understood that any terminal device in the wireless communications system may communicate, based on a same method, with one or more network devices having the wireless communication connection. This is not limited in this application.

Figure 2:
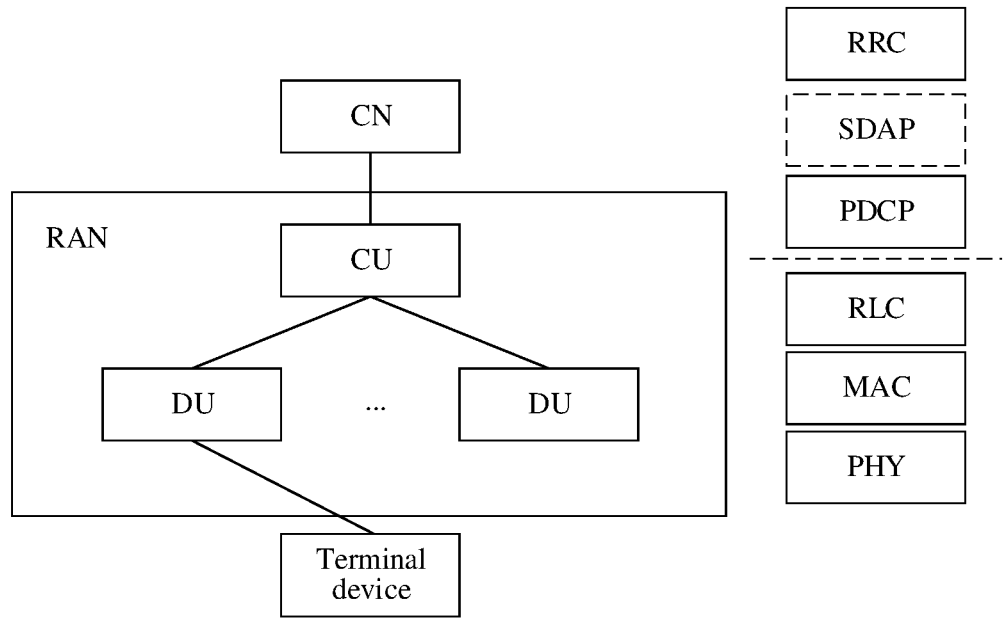
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented by being disposed remotely from the baseband apparatus, or may be integrated into the baseband apparatus, or may be partially disposed remotely from the baseband apparatus and partially integrated into the baseband apparatus. For example, in an LTE communications system, a RAN device (eNB) includes a baseband apparatus and a radio frequency apparatus. The radio frequency apparatus may be disposed remotely relative to the baseband apparatus. For example, a remote radio unit (RRU) is disposed remotely relative to a BBU.

Communication between the RAN device and a terminal device complies with a specified protocol layer structure. For example, a control plane protocol layer structure may have functions of protocol layers such as radio resource control (RRC) layer, a packet data convergence protocol (PDCP) layer, a radio link control (RLC) layer, a medium access control (MAC) layer, and a physical layer. A user plane protocol layer structure may have functions of protocol layers such as the PDCP layer, the RLC layer, the MAC layer, and the physical layer. In an implementation, a service data adaptation (SDAP) layer may be further included above the PDCP layer.

The functions of these protocol layers may be implemented by one node, or may be implemented by a plurality of nodes. For example, in an evolved structure, a RAN device may include a centralized unit (CU) and a distributed unit (DU), and a plurality of DUs may be centrally controlled by one CU. As shown in FIG. 2, the CU and the DU may be distinguished based on a protocol layer of a wireless network. For example, functions of the PDCP layer and a protocol layer above the PDCP layer are set in the CU, and functions of protocol layers below the PDCP layer, such as the RLC layer and the MAC layer, are set in the DU.

The functions of the protocol layers such as radio resource control (RRC), a packet data convergence protocol (PDCP), radio link control (RLC), and medium access control (MAC) may be implemented by one node, or implemented by a plurality of nodes. For example, in an evolved structure, a RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a protocol layer above the PDCP layer are set in the CU, and functions of protocol layers below the PDCP, such as the RLC layer and the MAC layer, are set in the DU.

Such division at the protocol layers is merely an example, and division at another protocol layer may alternatively be performed, for example, at the RLC layer. Functions of the RLC layer and a protocol layer above the RLC layer are set in the CU, and a function of a protocol layer below the RLC layer is set in the DU. Alternatively, division is performed at a protocol layer. For example, a partial function of the RLC layer and a function of a protocol layer above the RLC layer are set in the CU, and a remaining function of the RLC layer and a function of a protocol layer below the RLC layer are set in the DU. In addition, division may alternatively be performed in another manner, for example, division is performed based on a delay. A function in which processing time needs to meet a delay requirement is set in the DU, and a function in which processing time does not need to meet the delay requirement is set in the CU.

In addition, the radio frequency apparatus may be disposed remotely and may not be placed in the DU, or may be integrated into the DU, or may be partially disposed remotely from the DU and partially integrated into the DU. This is not limited herein.

Figure 3:
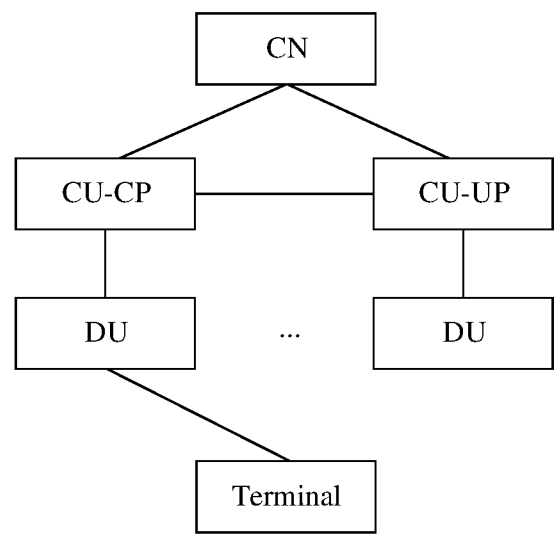
FIG. 3 is a schematic diagram of another network architecture according to an embodiment of this application.

Referring to FIG. 3, FIG. 3 is a schematic diagram of another network architecture according to an embodiment of this application. Different from the architecture shown in FIG. 2, a control plane (CP) and a user plane (UP) of a CU may be further separated, and are implemented by a control plane CU entity (CU-CP entity) and a user plane CU entity (CU-UP entity) respectively.

In the foregoing network architecture, signaling generated by the CU may be sent to a terminal device by using a DU, or signaling generated by a terminal device may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal device is involved, that the DU sends or receives the signaling includes this scenario. For example, signaling at an RRC layer or a PDCP layer is finally processed as signaling at a PHY layer and the signaling at the PHY layer is sent to the terminal device, or signaling at an RRC layer or a PDCP layer is converted from received signaling at a PHY layer. In this architecture, it may alternatively be considered that the signaling at the RRC or PDCP layer is sent by the DU, or sent by the DU and a radio frequency device.

In the foregoing embodiment, the CU is a network device on a RAN side. In addition, the CU may alternatively be a network device on a CN side. This is not limited herein.

In the following embodiments of this application, when the foregoing CU-DU structure is used, the network device may be a CU node, a DU node, or a RAN device including a CU node and a DU node.

Before the embodiments of this application are described, the following first briefly describes technical terms in the embodiments of this application.

1. Absolute Radio-Frequency Channel Number (ARFCN)

An absolute radio-frequency channel number in LTE (E-UTRAN absolute radio frequency channel number, EARFCN) indicates a frequency location of one LTE carrier for each code number. Because a reference start point in a calculation method of the EARFCN is a start point of each frequency band, EARFCNs are different in different frequency bands corresponding to a same frequency.

For example, a range of an LTE band 38 is 2570 MHz to 2620 MHz, and a range of an LTE band 41 is 2496 MHz to 2690 MHz. The two bands actually overlap on 2570 MHz to 2620 MHz. 2570 MHz is used as an example. In the band 38, an EARFCN number corresponding to this frequency location is 37750. In the band 41, an EARFCN number corresponding to this frequency location is 40390.

An absolute radio-frequency channel number in NR (NR absolute radio frequency channel number, NR-ARFCN) is similar to that in LTE. However, in a calculation method of the NR-ARFCN, a reference start point is a common frequency. Therefore, NR-ARFCNs are the same in different bands corresponding to a same frequency, in other words, each NR-ARFCN corresponds to a unique absolute frequency location.

2. Synchronization Signal Broadcast Channel Block (Synchronous Signal/PBCH Block or SS/PBCH Block)

In LTE, frequency domain locations of a primary synchronization signal (PSS), a secondary synchronization signal (SSS), and a physical broadcast channel (PBCH) block are different from those in NR, and the PSS and the SSS are located at a carrier frequency. Therefore, the carrier frequency is delivered in measurement configuration information in the LTE.

The SS/PBCH block may also be referred to as an SSB. The SSB is a reference signal in radio resource management (RRM) measurement in the NR, and includes a synchronization signal/a physical broadcast channel. One SSB includes a primary synchronization signal, a secondary synchronization signal, a physical broadcast channel (PBCH), and a demodulation reference signal (DMRS) required for demodulating the PBCH. The PSS is mainly used for coarse synchronization, the SSS is used for fine synchronization and SSB-based measurement, the PBCH is used to broadcast cell-level system information, and the DMRS may be used for SSB-based measurement in addition to PBCH demodulation.

3. Channel State Information Reference Signal (CSI-RS)

The CSI-RS is another reference signal in radio resource management (RRM) measurement in NR.

4. Frequency Band List

In LTE, frequencyBandInfo and an extended frequency band indicator (MFBI) are delivered in an idle-mode system message, so that a terminal device that supports only an extended frequency band of a network device can also camp on the network device. A carrier frequency is delivered in measurement configuration information in the LTE, and the information naturally correspond to a band. Band information of a target cell is delivered in handover signaling in the LTE, so that the terminal device uniquely determines a handover target.

In NR, a frequency band list of a current serving cell or a neighboring cell may be delivered in an idle-mode system message, a connected-mode handover command, or connected-mode cell activation signaling. However, content related to the frequency band list delivered in the idle-mode system message is different from content related to the frequency band list delivered in the signaling in the connected-mode. Information about a plurality of frequency bands delivered in the idle-mode system message includes information about a plurality of frequency bands to which a current carrier of the network device belongs. Information about a unique frequency band is delivered in connected-mode handover (HO) signaling or other connected-mode signaling.

5. RF Channel Parameter

Currently, in NR, working spectrums of a mobile communications system in countries and regions around the world are discrete. Dozens of working frequency bands are defined both in an LTE protocol and in a NR protocol. In many working frequency bands, some spectrums overlap. In an RF design of a terminal device, different bands at an overlapping spectrum may be supported by using different RF channels, and RF front-end components on different RF channels may be stacked and selected differently. This results in different insertion losses of front-end components on RF channels in different bands corresponding to a same frequency. The different insertion losses of the front-end components directly result in different noise figures on the different RF channels. To be specific, noise is raised by thermal noise of a circuit.

A correspondence between each band of the terminal device and a radio frequency channel, and a corresponding RF channel parameter may be stored in an NV (nonvolatile) file of the terminal device. When the terminal device is powered on, content of the file is loaded to a memory of the terminal device. When needing to use these parameters, the terminal device may obtain them from the memory.

In the prior art, connected-mode neighboring cell measurement configuration information of a terminal device includes an absolute radio-frequency channel number. After the terminal device receives the absolute radio-frequency channel number, the absolute radio-frequency channel number may correspond to a plurality of frequency bands. For example, one absolute radio-frequency channel number corresponds to two frequency bands (a band A and a band B). The terminal device may support both the band A and the band B, and can report, based on a capability of the terminal device, that the terminal device may support both the band A and the band B. In this case, the terminal device needs to select an RF channel. Currently, only a manner of delivering the absolute radio-frequency channel number is used in an NR protocol. It is assumed that a plurality of overlapping frequency bands are supported by using one RF channel, or a plurality of overlapping frequency bands are supported by using a plurality of RF channels on the premise that RF performance of the plurality of RF channels is the same. However, neither of the two assumptions may be true in actual implementation of the terminal device.

In the embodiments of this application, frequency band information (for example, a frequency band list) of a measurement object is added to the measurement configuration information. The frequency band information may be information about the plurality of frequency bands, or may be information about one frequency band. The terminal device may perform measurement based on the frequency band information added to the measurement configuration. This helps ensure consistency between an entire measurement process and a final handover process decision.

Figure 4:
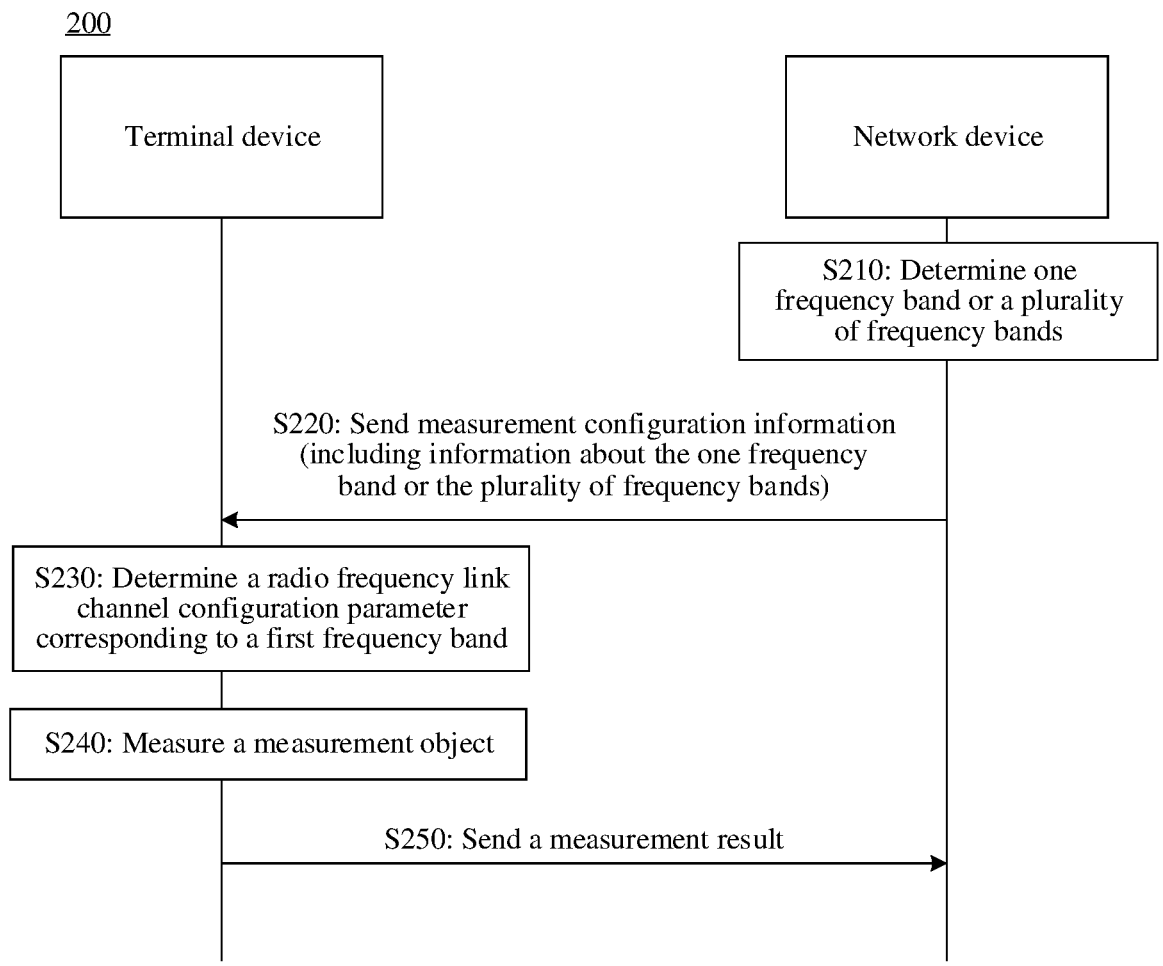
FIG. 4 is a schematic flowchart of a measurement method according to an embodiment of this application.

FIG. 4 is a schematic flowchart of a measurement method 200 according to an embodiment of this application. As shown in FIG. 4, the method 200 includes the following steps.

S210: A network device determines one frequency band or a plurality of frequency bands.

Specifically, a terminal device performs measurement by using the one frequency band or the plurality of frequency bands, and the terminal device may select one frequency band from the one frequency band or the plurality of frequency bands for measurement.

S220: The network device sends measurement configuration information to the terminal device, and the terminal device receives the measurement configuration information sent by the network device, where the measurement configuration information includes at least an absolute radio-frequency channel number of a measurement object and information that is of the measurement object and that is about the one frequency band or the plurality of frequency bands.

Optionally, the network device sends RRC reconfiguration signaling to the terminal device, and measurement configuration signaling (measConfig) in the signaling includes information about measurement object information.

Specifically, after determining the one frequency band or the plurality of frequency bands, the network device sends the measurement configuration information to the terminal device. Compared with the prior aft, the network device may add a field to the measurement object information in the measurement configuration information to indicate the one frequency band or the plurality of frequency bands.

It should be understood that, in this embodiment of this application, that the measurement configuration information includes at least an absolute radio-frequency channel number of a measurement object and information that is of the measurement object and that is about the one frequency band or the plurality of frequency bands may be further understood as that the measurement configuration information includes at least a mapping relationship between the absolute radio-frequency channel number of the measurement object and the one frequency band or the plurality of frequency bands.

Optionally, the mapping relationship may be represented in a form of a table. The mapping relationship may be a mapping relationship between the absolute radio-frequency channel number and one frequency band. Table 1 shows a mapping relationship between one absolute radio-frequency channel number and one frequency band.

TABLE 1

Mapping relationship between one absolute radio-
frequency channel number and one frequency band

| Absolute radio-frequency channel number | Frequency band |
|---|---|
| X | Band A |

It should be understood that the band A includes a frequency location corresponding to the absolute radio-frequency channel number X.

Optionally, the mapping relationship may alternatively be a mapping relationship between the absolute radio-frequency channel number and a plurality of frequency bands. Table 2 shows a mapping relationship between one absolute radio-frequency channel number and a plurality of frequency bands.

TABLE 2

Mapping relationship between one absolute radio-frequency
channel number and a plurality of frequency bands

| Absolute radio-frequency channel number | Frequency band |
|---|---|
| X | Band B |
|   | Band C |

It should be understood that the band C and the band B include a frequency location corresponding to the absolute radio-frequency channel number X.

It should be further understood that Table 2 is merely an example. The measurement configuration information may include information about two bands (the band B and the band C) corresponding to the absolute radio-frequency channel number X, and may alternatively include information about three or more frequency bands corresponding to the absolute radio-frequency channel number X.

It should be further understood that, in calculation of the absolute radio-frequency channel number, the absolute radio-frequency channel number X may correspond to three frequency bands (the band A, the band B, and the band C), but the information about the one frequency band or the plurality of frequency bands that is added by the network device to the measurement configuration may be the information about the band B and the band C.

Optionally, the measurement configuration information further includes a reporting configuration, a measurement configuration (e.g.quantity configuration), a measurement interval configuration, and the like.

Optionally, the measurement object information further includes the field used to indicate the one frequency band or the plurality of frequency bands.

Specifically, the measurement object in this embodiment of this application may be an SSB or a CSI-RS. The network device may add a field to the measurement object information in the measurement configuration information, to indicate information about one frequency band or a plurality of frequency bands corresponding to the SSB and information about one frequency band or a plurality of frequency bands corresponding to the CSI-RS.

It should be understood that the one frequency band or the plurality of frequency bands corresponding to the SSB may be different from the one frequency band or the plurality of frequency bands corresponding to the CSI-RS.

Optionally, the information about the one frequency band or the plurality of frequency bands may be a frequency band list.

According to the measurement method in this embodiment of this application, the network device delivers information about a unique frequency band in the measurement configuration information. This helps avoid incorrect handover or a handover failure of the terminal device while ensuring measurement precision.

In some possible implementations, if the one frequency band or the plurality of frequency bands determined by the network device includes/include neither a primary supported frequency band of the network device nor an extended supported frequency band of the network device, the network device may not send the measurement configuration information to the terminal device.

S230: The terminal device determines a radio frequency link channel configuration parameter corresponding to a first frequency band, where the first frequency band is the one frequency band or the plurality of frequency bands, or the first frequency band is one of the plurality of frequency bands.

It should be understood that, in this embodiment of this application, the radio frequency link channel configuration parameter actually corresponds to selection of an RF channel, and a configuration of the RF channel mainly includes a number of the RF channel and different compensation coefficients of automatic gain control (AGC).

Specifically, after the network device sends the measurement configuration information to the terminal device, the terminal device obtains the information about the one frequency band or the plurality of frequency bands. If the first frequency band is one of the plurality of frequency bands, the terminal device selects the first frequency band from the plurality of frequency bands, and determines the radio frequency link channel configuration parameter corresponding to the first frequency band. Alternatively, if the first frequency band is the one frequency band or the plurality of frequency bands, the terminal device determines the radio frequency link channel configuration parameter corresponding to the first frequency band.

For example, if the first frequency band is one of the plurality of frequency bands (for example, the plurality of frequency bands include the band B and the band C), the terminal device may first select one frequency band (for example, the band B) from the two frequency bands, and then determine an RF channel configuration parameter corresponding to the band B.

For another example, if the first frequency band is the one frequency band or the plurality of frequency bands (for example, the band A, where the band A may include one frequency band or may include a plurality of frequency bands), the terminal device may directly determine an RF channel configuration parameter corresponding to the band A.

Optionally, when the first frequency band is one of the plurality of frequency bands, and before the determining, by the terminal device, a radio frequency link channel configuration parameter corresponding to a first frequency band, the method further includes: determining, by the terminal device, the first frequency band from the plurality of frequency bands.

Optionally, the terminal device selects the first frequency band from the plurality of frequency bands based on a hardware capability of the terminal device.

Optionally, the determining, by the terminal device, the first frequency band from the plurality of frequency bands includes: determining, by the terminal device, a frequency band that is of the plurality of frequency bands and that is the same as that of a serving cell as the first frequency band; or determining, by the terminal device as the first frequency band, a frequency band corresponding to a radio frequency link channel with best noise figure performance in a plurality of radio frequency link channels, where the plurality of frequency bands correspond to the plurality of radio frequency link channels.

It should be understood that, in this embodiment of this application, in a radio frequency (RF) link design of UE, different frequency bands at an overlapping spectrum may be supported by using different RF channels, and RF front-end components on different RF channels may be stacked and selected differently. This results in different insertion losses of the front-end components on RF channels in different frequency bands corresponding to a same frequency. The different insertion losses are directly represented as different noise figures on the different RF channels. To be specific, noise is raised by thermal noise of a circuit. The different noise figures on the RF channels result in different measurement results obtained by the terminal device by measuring the measurement object. As a result, precision obtained on the RF channels corresponding to the different frequency bands is different.

Optionally, the first frequency band is the primary frequency band of the network device, or the first frequency band is one of extended supported frequency bands of the network device.

S240: The terminal device measures the measurement object based on the radio frequency link channel configuration parameter.

S250: The terminal device sends a measurement result of the measurement object to the network device, and the network device receives the measurement result sent by the terminal device.

Optionally, the measurement object may include an SSB and/or a CSI-RS.

Optionally, the measurement result includes one or more of a signal-to-interference-plus-noise ratio (SINR), reference signal received power (RSRP), reference signal received quality, or a received signal strength indicator (RSSI) of the measurement object.

Specifically, after determining the radio frequency link channel configuration parameter corresponding to the first frequency band, the terminal device receives the measurement object (the SSB and/or the CSI-RS) on an RF channel corresponding to the first frequency band. The terminal device receives the SSB and/or the CSI-RS at a frequency location corresponding to the absolute radio-frequency channel number of the measurement object.

Physical layer measurement types include: the RSSI, SS-RSRP, CSI-RSRP, SS-RSRQ, CSI-RSRQ, an SS-SINR, and/or a CSI-SINR. All these measurement types may be used for connected-mode intra-frequency/inter-frequency measurement.

The SS-RSRP is defined as a linear average value of power received on resource elements (RE) that bear secondary synchronization reference signals (SSS), where a measurement reference point is located at an antenna connector of the UE.

The CSI-RSRP is defined as a linear average value of power received on REs that bear CSI-RSs, where an available measurement bandwidth is indicated by signaling, and a measurement reference point is located at the antenna connector of the UE.

The SS-RSRQ is defined as N×SS-RSRP/NR carrier RSSI. The SS-RSRP represents a linear average value of power received on REs that bear SSs, and the RSSI is a received signal strength indicator of an NR carrier, to be specific, a linear average of total power received on a measurement bandwidth within a measurement time resource. The total received power includes power of various sources, for example, the serving cell, a non-serving cell, adjacent channel interference, and thermal noise. A definition of the CSI-RSRQ is similar to that of the SS-RSRQ.

The SS-SINR is defined as a ratio of a linear average of power received on REs that bear SSSs to power of noise and interference. A definition of the CSI-SINR is similar to that of the SS-SINR.

Measurement of a reference signal is receiving and power calculation of a corresponding signal on a corresponding time-frequency resource specified in a signaling indication or a protocol. The RSRP is an absolute power value of a reference signal at the antenna connector. Through compensating for power of thermal noise of a front-end component on a corresponding RF channel, measurement results of the RSRP in different frequency bands corresponding to a same frequency are the same. Measurement values of the RSRQ and the SINR are measurement power values including noise power, in other words, reflect a signal-to-noise ratio. Noise inconsistency of the front-end component affects precision of this type of measurement value.

It should be understood that, in this embodiment of this application, a process of receiving the measurement object is a process of measuring the measurement object.

It should be further understood that, in this embodiment of this application, a type of a received signal is not limited, and the received signal may be an SSB and/or a CSI-RS, or may be another signal.

Optionally, the method further includes: determining, by the network device based on the measurement result, whether to hand over the terminal device.

Specifically, after the terminal device reports the measurement result, the network device may determine, based on the measurement result, whether to hand over the terminal device.

It should be understood that, in this embodiment of this application, after the terminal device measures a corresponding measurement object, if a measurement result corresponds to an event, a trigger event is reported, and a measurement value is sent to the network device in a measurement report. The network device notifies, by using a handover command, the terminal device of performing handover. A corresponding definition of reporting the trigger event is as follows:

an event A1 (a trigger quantity of the serving cell is greater than a threshold): used to stop inter-frequency measurement;

an event A2 (a trigger quantity of the serving cell is less than a threshold): used to start inter-frequency measurement;

an event A3 (a trigger quantity of a neighboring cell is greater than that of the serving cell after an offset value is considered): used to initiate an intra-frequency/inter-frequency handover request;

an event A4 (a trigger quantity of a neighboring cell is greater than a threshold): used to initiate an inter-frequency handover request;

an event A5 (a trigger quantity of the serving cell is less than a threshold 1 and a trigger quantity of a neighboring cell is greater than a threshold 2): used to initiate an inter-frequency handover request; or an event A6 (a trigger quantity of a neighboring cell is greater than that of a secondary cell (SCell) after an offset value is considered): used to initiate an intra-frequency/inter-frequency handover request.

It should be further understood that, in this embodiment of this application, the measurement object is measured based on the RF channel configuration parameter corresponding to the first frequency band, and the obtained measurement result is a measurement result of the neighboring cell. For example, if the measurement result is greater than the threshold, the measurement result is reported to the network device, and the network device notifies, based on the measurement result by using the handover command, the terminal device of performing handover. The handover command includes information about the first frequency band.

The foregoing describes the measurement method 200 in the embodiment of this application with reference to FIG. 4. In the measurement method 200, the network device delivers the information about the one frequency band or the plurality of frequency bands to the terminal device. This helps increase measurement precision of the terminal device. The following describes a method 300 in an embodiment of this application with reference to FIG. 5. In the method 300, a process in which the network device determines the one frequency band or the plurality of frequency bands in the method 200 is specifically described.

Figure 5:
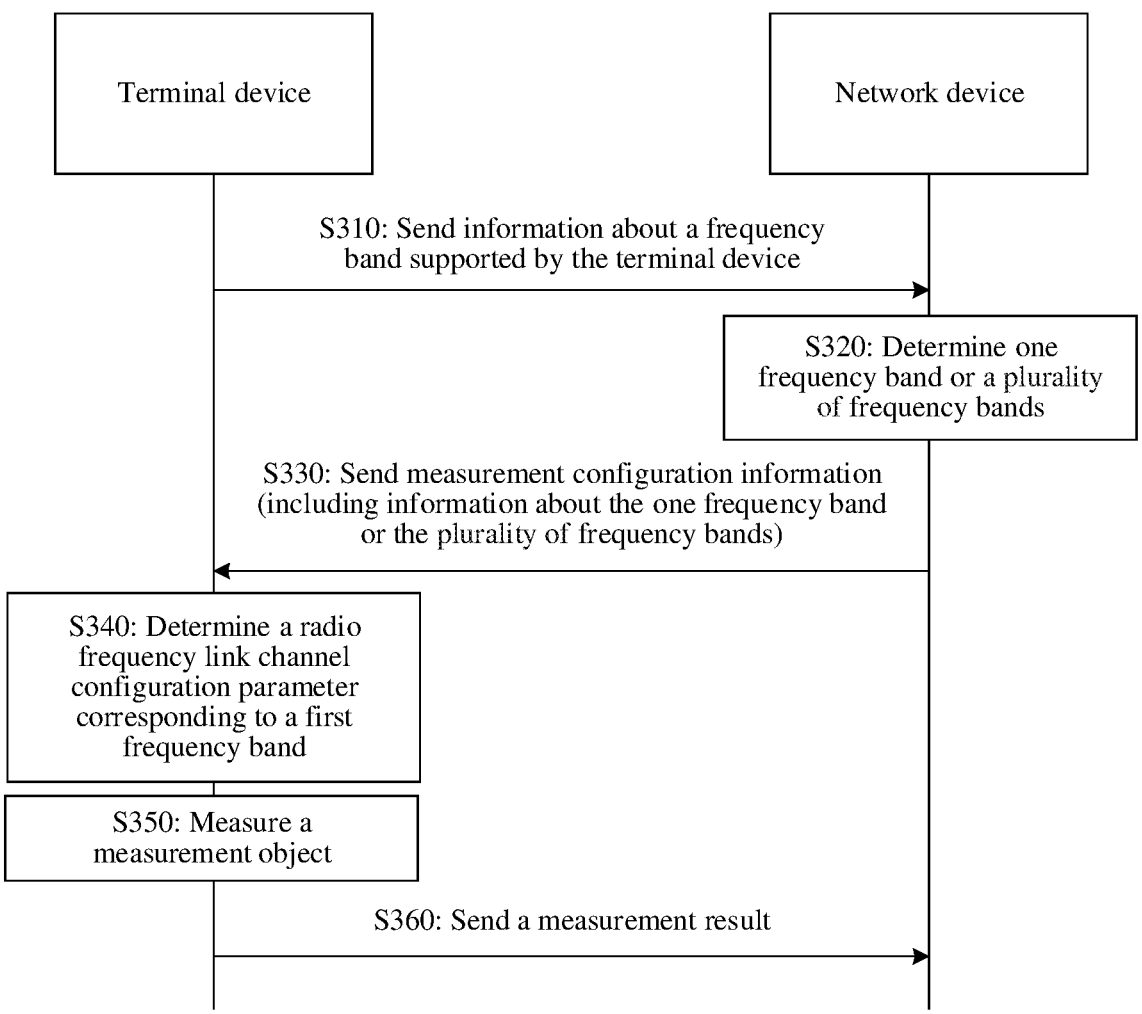
FIG. 5 is another schematic flowchart of a measurement method according to an embodiment of this application.

FIG. 5 shows a measurement method 300 according to an embodiment of this application. As shown in FIG. 5, the measurement method 300 includes the following steps.

S310: A terminal device sends information about a frequency band supported by the terminal device to a network device, and the network device receives the information about the frequency band supported by the terminal device.

Specifically, the terminal device may add, to capability reporting signaling, the information about the frequency band supported by the terminal device.

For example, if a frequency band set supported by the terminal device is X={Band A, Band B, Band C}, the terminal device may add a field to the capability reporting signaling to indicate the frequency band set X supported by the terminal device.

S320: The network device determines one frequency band or a plurality of frequency bands based on the frequency band supported by the terminal device and a frequency band to which a carrier currently deployed by the network device belongs.

Optionally, the one frequency band or the plurality of frequency bands is/are an intersection set of the frequency band supported by the terminal device and the frequency band to which the carrier currently deployed by the network device belongs.

For example, the terminal device reports, by using the capability reporting signaling, that the frequency band set supported by the terminal device is X={Band A, Band B, Band C}, and a frequency band set to which the carrier currently deployed by the network device belongs is Y={Band B, Band C, Band D}. In this case, the network device may determine, by using the frequency band set X and the frequency band set Y, that an intersection set of the frequency band set X and the frequency band set Y is Z={Band B, Band C}, and the one frequency band or the plurality of frequency bands are the band B and the band C.

According to the measurement method in this embodiment of this application, the network device determines information about the plurality of frequency bands based on a capability of the terminal device, and delivers the information to the terminal device in measurement configuration information. This helps increase measurement precision.

Optionally, the one frequency band or the plurality of frequency bands is/are one frequency band in the intersection set.

Optionally, the one frequency band or the plurality of frequency bands is/are one frequency band in the intersection set, and the one frequency band is a primary supported frequency band of the network device, or the one frequency band is an extended supported frequency band of the network device.

For example, the terminal device reports, by using the capability reporting signaling, that the frequency band set supported by the terminal device is X={Band A, Band B, Band C}, and a frequency band set to which the carrier currently deployed by the network device belongs is Y={Band B, Band C, Band D}. In this case, the network device may determine, by using the frequency band set X and the frequency band set Y, that an intersection set of the frequency band set X and the frequency band set Y is Z={Band B, Band C}. The network device finds, through comparison, that the terminal device supports a primary supported frequency band, namely, the band B, of the network device. Therefore, the network device determines that the one frequency band or the plurality of frequency bands is/are the band B.

For another example, the terminal device reports, by using the capability reporting signaling, that the frequency band set supported by the terminal device is X={Band A, Band B, Band C}, and a frequency band set to which the carrier currently deployed by the network device belongs is Y={Band C, Band D}. In this case, the network device may determine, by using the frequency band set X and the frequency band set Y, that an intersection set of the frequency band set X and the frequency band set Y is Z={Band C}. The network device finds, through comparison, that the terminal device does not support a primary supported frequency band, namely, the band D, of the network device but the terminal device supports an extended supported frequency band, namely, the band C, of the network device. Therefore, the network device determines that the one frequency band or the plurality of frequency bands is/are the band C.

For still another example, the terminal device reports, by using the capability reporting signaling, that the frequency band set supported by the terminal device is X={Band A, Band B, Band C}, and a frequency band set to which the carrier currently deployed by the network device belongs is Y={Band B, Band C, Band D}. In this case, the network device may determine, by using the frequency band set X and the frequency band set Y, that an intersection set of the frequency band set X and the frequency band set Y is Z={Band B, Band C}. In this case, the network device finds, through comparison, that the terminal device does not support a primary supported frequency band, namely, the band D, of the network device but supports extended supported frequency bands, namely, the band B and the band C, of the network device. Therefore, the network device determines that the one frequency band or the plurality of frequency bands is/are the band B and/or the band C.

It should be understood that, in this embodiment of this application, the one frequency band or the plurality of frequency bands may include the primary frequency band and/or the extended supported frequency band of the network device, and may further include another frequency band. For example, the one frequency band or the plurality of frequency bands may further include a new frequency band (for example, a new frequency band in some use scenarios), or a frequency band may be reused.

S330: The network device sends the measurement configuration information to the terminal device, and the terminal device receives the measurement configuration information sent by the network device, where the measurement configuration information includes at least an absolute radio-frequency channel number of a measurement object and information that is of the measurement object and that is about the one frequency band or the plurality of frequency bands.

S340: The terminal device determines a radio frequency link channel configuration parameter corresponding to a first frequency band, where the first frequency band is the one frequency band or one of the plurality of frequency bands.

S350: The terminal device measures the measurement object based on the radio frequency link channel configuration parameter.

S360: The terminal device sends a measurement result of the measurement object to the network device, and the network device receives the measurement result sent by the terminal device.

It should be understood that processes of S330 to S360 are similar to those of S220 to S250 in the method 200. For brevity, details are not described herein.

According to the measurement method in this embodiment of this application, the network device determines the one frequency band or the plurality of frequency bands based on the frequency band supported by the terminal device, and adds the information about the one frequency band or the plurality of frequency bands to the measurement configuration information. This helps the terminal device increase measurement precision.

The foregoing respectively describes the measurement method 200 and the method 300 in the embodiments of this application with reference to FIG. 4 and FIG. 5. The measurement configuration information in each of the method 200 and the method 300 includes the information about the one frequency band or the plurality of frequency bands. The terminal device finally selects only the one frequency band or only one of the plurality of frequency bands for measurement, and reports a measurement result for the frequency band to the network device. The following respectively describes a method 400 and a method 500 in the embodiments of this application with reference to FIG. 6 and FIG. 7. In the method 400 and the method 500, the terminal device may select a plurality of frequency bands for measurement, and report a plurality of measurement results to the network device.

Figure 6:
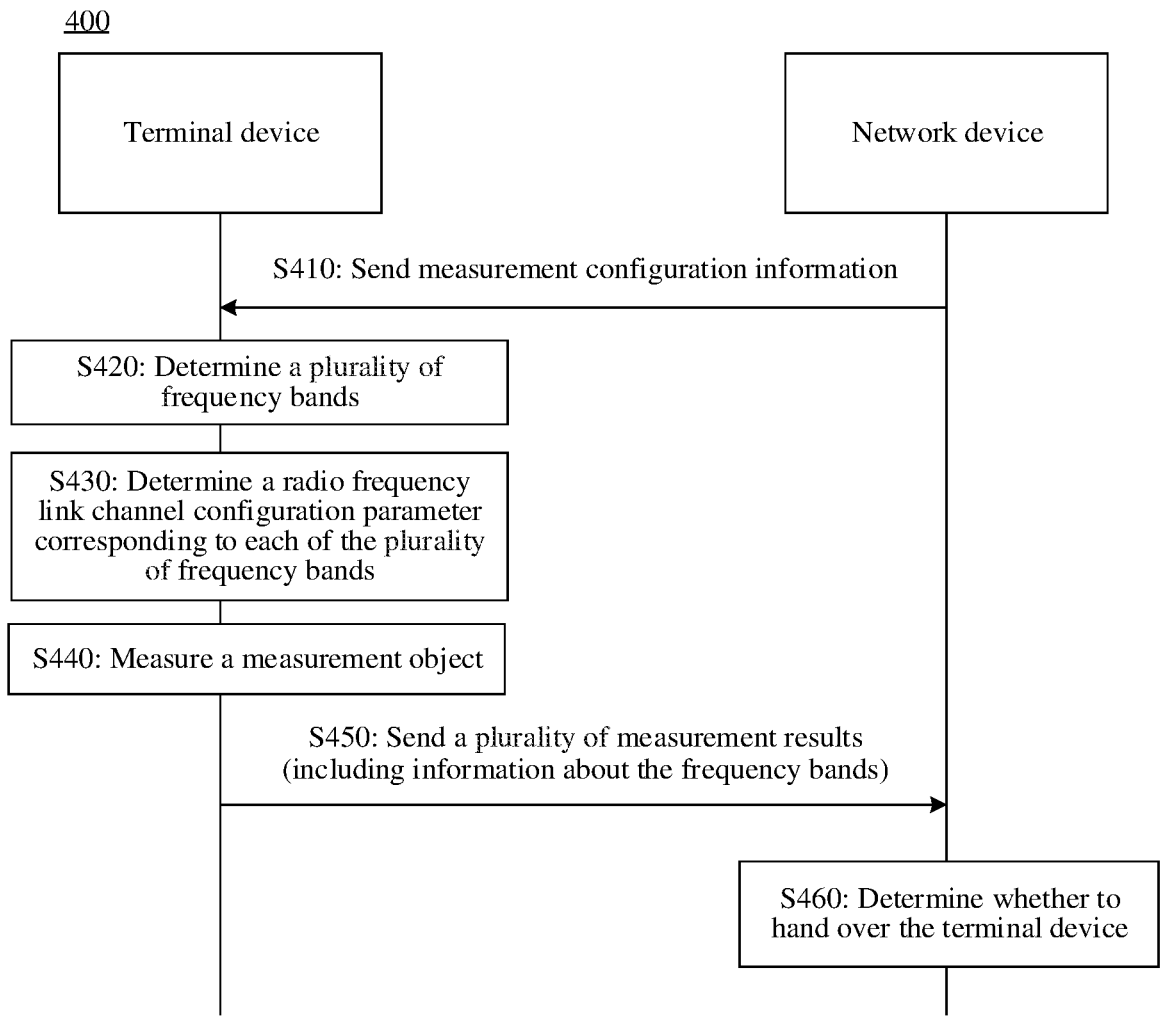
FIG. 6 is still another schematic flowchart of a measurement method according to an embodiment of this application.

FIG. 6 is a schematic flowchart of a measurement method 400 according to an embodiment of this application. As shown in FIG. 6, the method 400 includes the following steps.

S410: A network device sends measurement configuration information to a terminal device, and the terminal device receives the measurement configuration information sent by the network device, where the measurement configuration information includes at least an absolute radio-frequency channel number of a measurement object.

Optionally, measurement object information in the measurement configuration information may include the absolute radio-frequency channel number of the measurement object.

Optionally, the measurement configuration information may further include a reporting configuration, a measurement interval configuration, and the like.

S420: The terminal device determines, based on the absolute radio-frequency channel number, a plurality of frequency bands corresponding to the absolute radio-frequency channel number.

Specifically, in NR, because a reference start point is a common frequency, one absolute radio-frequency channel number may correspond to a plurality of overlapping frequency bands. After receiving the measurement configuration information, the terminal device may determine the plurality of frequency bands corresponding to the absolute radio-frequency channel number.

Optionally, the plurality of frequency bands include a primary frequency band of the network device and/or an extended supported frequency band of the network device.

It should be understood that, in this embodiment of this application, the frequency band or the plurality of frequency bands may include the primary frequency band and/or the extended supported frequency band of the network device, and may further include another frequency band. For example, the one frequency band or the plurality of frequency bands may further include a new frequency band, or a frequency band is reused.

S430: The terminal device determines a radio frequency link channel configuration parameter corresponding to each of the plurality of frequency bands.

S440: The terminal device measures the measurement object based on the radio frequency link channel configuration parameter corresponding to each of the plurality of frequency bands, to obtain a plurality of measurement results, where each of the plurality of measurement results includes at least information about a frequency band corresponding to the measurement result.

For example, the absolute radio-frequency channel number included in the measurement configuration information corresponds to a first frequency band and a second frequency band, and the terminal device determines an RF channel configuration parameter of the first frequency band and an RF channel configuration parameter of the second frequency band (the first frequency band corresponds to a first configuration parameter, and the second frequency band corresponds to a second configuration parameter). The terminal device separately measures the measurement object by using the first configuration parameter and the second configuration parameter, to obtain a first measurement result (a measurement result for the first frequency band) and a second measurement result (a measurement result for the second frequency band). The first measurement result includes information about the first frequency band, and the second measurement result includes information about the second frequency band.

S450: The terminal device sends the plurality of measurement results to the network device, and the network device receives the plurality of measurement results.

S460: The network device determines, based on the plurality of measurement results, whether to hand over the terminal device.

For example, the network device may determine, based on the first measurement result, whether to hand over the terminal device. The plurality of measurement results include the first measurement result, and a frequency band corresponding to the first measurement result is the primary supported frequency band of the network device.

Further, the network device determines to hand over the terminal device, and sends a handover command to the terminal device, where the handover command includes information about the primary supported frequency band of the network device.

For example, the network device may determine, based on the first measurement result, whether to hand over the terminal device, where the first measurement result is a best measurement result in the plurality of measurement results.

Further, the network device determines to hand over the terminal device, and sends a handover command to the terminal device, where the handover command includes information about a frequency band corresponding to the first measurement result.

It should be understood that, in this embodiment of this application, the terminal device sends the plurality of measurement results to the network device through measurement reporting, and the determining, by the network device, whether to perform handover belongs to implementation of the network device.

For example, the plurality of measurement results include the first measurement result (including the information about the first frequency band) and the second measurement result (including the information about the second frequency band). If the network device finds that the first measurement result is greater than a threshold and the second measurement result is less than the threshold, or that the first measurement result is greater than the second measurement result and both the first measurement result and the second measurement result are greater than a threshold, the network device may send the handover command to the terminal device, where the handover command includes the information about the first frequency band.

For another example, the plurality of measurement results include the first measurement result (including the information about the first frequency band) and the second measurement result (including the information about the second frequency band). The first frequency band is the primary supported frequency band of the network device, and the second frequency band is the extended supported frequency band of the network device. If the network device finds that the first measurement result is less than a threshold and the second measurement result is greater than the threshold, the network device may determine, by using a measurement result corresponding to the primary frequency band as a handover determining condition, that the terminal device does not perform handover.

According to the measurement method in this embodiment of this application, information about a frequency band corresponding to a measurement result is carried during the measurement reporting. This helps avoid a handover failure or incorrect handover of the terminal device.

The foregoing describes the measurement method 400 in this embodiment of this application with reference to FIG. 6. The measurement configuration information in the measurement method 400 may be the same as measurement configuration information in the prior art. However, the terminal device measures the plurality of frequency bands corresponding to the absolute radio-frequency channel number in the measurement configuration information to obtain the plurality of measurement results. To further reduce a quantity of measurements performed by the terminal device, an embodiment of this application further provides a measurement method 500. In the method 500, the network device may add, to measurement configuration information, information about a plurality of frequency bands that need to be measured, to avoid excessive measurements performed by the terminal device.

Figure 7:
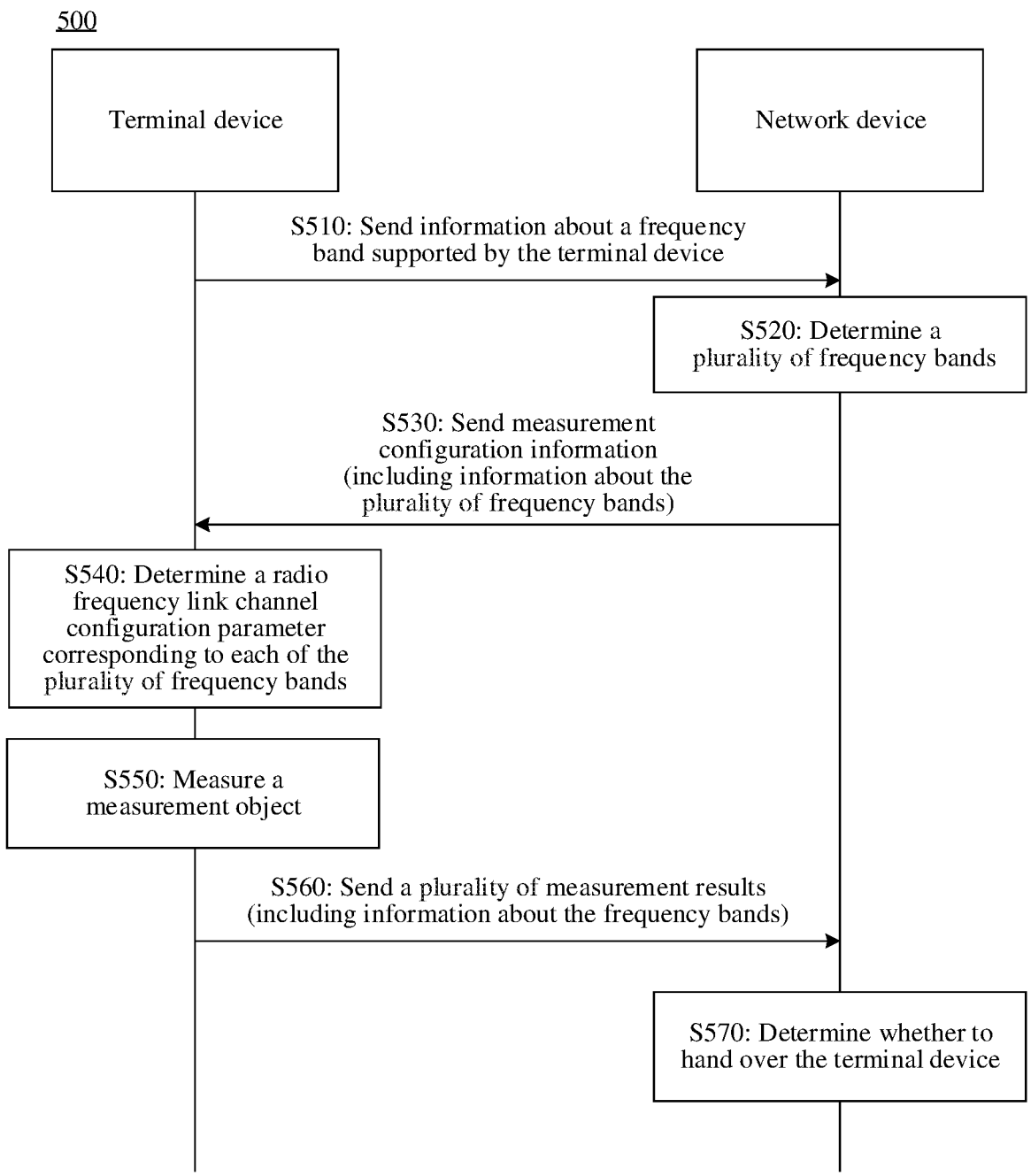
FIG. 7 is yet another schematic flowchart of a measurement method according to an embodiment of this application.

FIG. 7 is a schematic flowchart of a measurement method 500 according to an embodiment of this application. As shown in FIG. 7, the method 500 includes the following steps.

S510: A terminal device sends information about a frequency band supported by the terminal device to a network device, and the network device receives the information about the frequency band supported by the terminal device.

S520: The network device determines a plurality of frequency bands based on the frequency band supported by the terminal device and a frequency band to which a carrier currently deployed by the network device belongs.

S530: The network device sends measurement configuration information to the terminal device, and the terminal device receives the measurement configuration information sent by the network device, where the measurement configuration information includes at least an absolute radio-frequency channel number of a measurement object and information that is of the measurement object and that is about the plurality of frequency bands.

It should be understood that S510 to S530 are similar to S310 to S330 in the method 300. For brevity, details are not described herein.

Optionally, the plurality of frequency bands include a primary supported frequency band of the network device and/or an extended supported frequency band of the network device.

It should be understood that, in this embodiment of this application, the one frequency band or the plurality of frequency bands may include the primary frequency band and/or the extended supported frequency band of the network device, and may further include another frequency band. For example, the one frequency band or the plurality of frequency bands may further include a new frequency band, or a frequency band is reused.

S540: The terminal device determines a radio frequency link channel configuration parameter corresponding to each of the plurality of frequency bands.

S550: The terminal device measures the measurement object based on the radio frequency link channel configuration parameter corresponding to each of the plurality of frequency bands, to obtain a plurality of measurement results, where each of the plurality of measurement results includes information about a frequency band corresponding to the measurement result.

S560: The terminal device sends the plurality of measurement results to the network device, and the network device receives the plurality of measurement results.

S570: The network device determines, based on the plurality of measurement results, whether to hand over the terminal device.

It should be understood that S540 to S570 are similar to S430 to S460 in the method 400. For brevity, details are not described herein.

According to the measurement method in this embodiment of this application, the network device determines the plurality of frequency bands by using the frequency band supported by the terminal device, and adds the information about the plurality of frequency bands to the measurement configuration information. This helps reduce a quantity of measurements performed by the terminal device.

The foregoing describes in detail the measurement methods in the embodiments of this application with reference to FIG. 4 to FIG. 7. The following describes in detail a measurement apparatus and a communications device in embodiments of this application with reference to FIG. 8 to FIG. 12.

Figure 8:
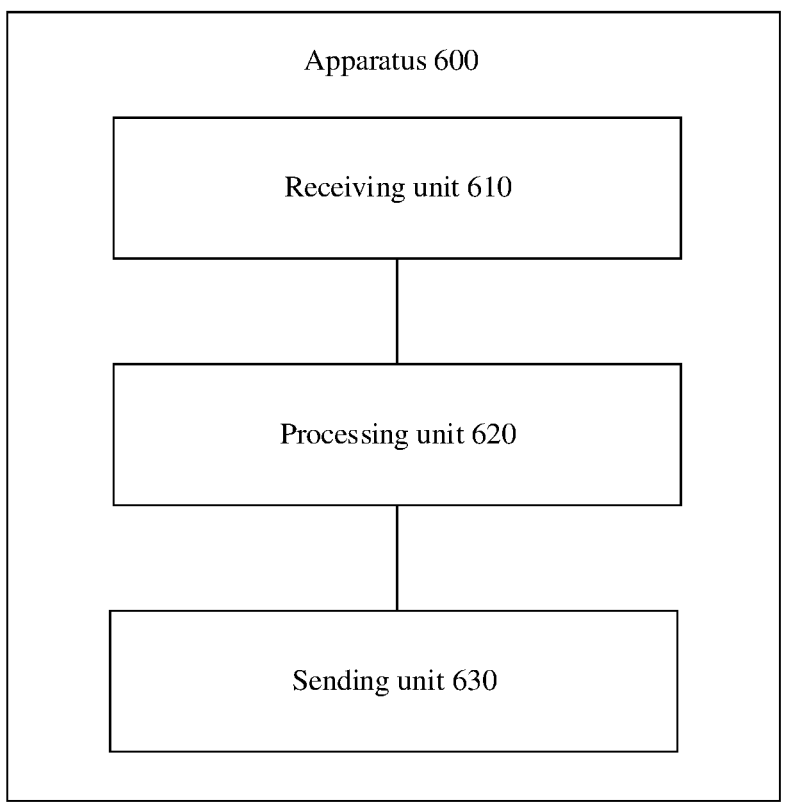
FIG. 8 is a schematic block diagram of a measurement apparatus according to an embodiment of this application.

FIG. 8 is a schematic block diagram of a measurement apparatus 600 according to an embodiment of this application. As shown in FIG. 8, the apparatus 600 includes: a receiving unit 610, configured to receive measurement configuration information sent by a network device, where the measurement configuration information includes at least an absolute radio-frequency channel number of a measurement object and information that is of the measurement object and that is about one frequency band or a plurality of frequency bands; a processing unit 620, configured to determine a radio frequency link channel configuration parameter corresponding to a first frequency band, where the first frequency band is the one frequency band or the plurality of frequency bands, or the first frequency band is one of the plurality of frequency bands; where the processing unit 620 is further configured to measure, based on the radio frequency link channel configuration parameter, the measurement object at a frequency location corresponding to the absolute radio-frequency channel number; and a sending unit 630, configured to send, to the network device, a measurement result obtained by the processing unit 620 by measuring the measurement object.

It should be understood that the apparatus 600 may correspond to the terminal device in the measurement method 200 in the embodiments of this application. The apparatus 600 may include units configured to perform the method performed by the terminal device in the measurement method 200 in FIG. 4. In addition, the units in the apparatus 600 and the foregoing other operations and/or functions are respectively used to implement corresponding procedures of the measurement method 200 in FIG. 4. For a specific process of performing the foregoing corresponding steps by the units, refer to the foregoing description with reference to the method embodiment in FIG. 4. For brevity, details are not described herein.

Optionally, the first frequency band is a primary frequency band of the network device, or the first frequency band is an extended supported frequency band of the network device.

Optionally, the processing unit 620 is further configured to: when the first frequency band is one of the plurality of frequency bands, determine the first frequency band from the plurality of frequency bands.

Optionally, the sending unit 630 is further configured to send information about a frequency band supported by the apparatus to the network device, where the frequency band supported by the apparatus includes the one frequency band or the plurality of frequency bands.

It should be understood that the apparatus 600 may further correspond to the terminal device in the measurement method 300 in the embodiments of this application. The apparatus 600 may include units configured to perform the method performed by the terminal device in the measurement method 300 in FIG. 5. In addition, the units in the apparatus 600 and the foregoing other operations and/or functions are used to implement corresponding procedures of the measurement method 300 in FIG. 5. For a specific process of performing the foregoing corresponding steps by the units, refer to the foregoing description with reference to the method embodiment in FIG. 5. For brevity, details are not described herein.

It should be further understood that the apparatus 600 in this embodiment of this application may be a terminal device, or may be a chip or an apparatus in a terminal device.

Figure 9:
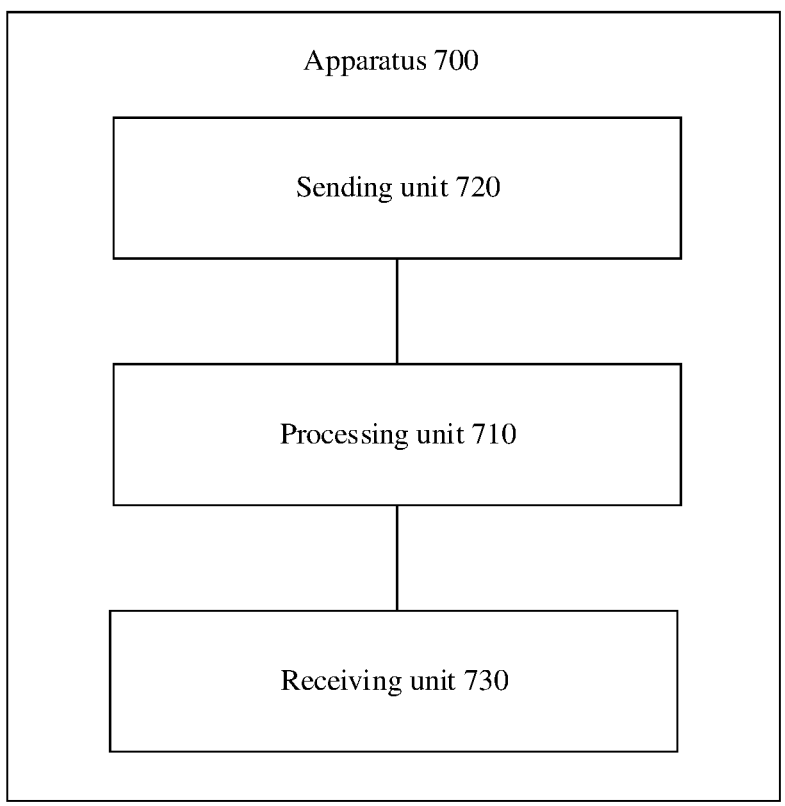
FIG. 9 is another schematic block diagram of a measurement apparatus according to an embodiment of this application.

FIG. 9 is a schematic block diagram of an apparatus 700 according to an embodiment of this application. As shown in FIG. 9, the apparatus 700 includes: a processing unit 710, configured to determine one frequency band or a plurality of frequency bands; a sending unit 720, configured to send measurement configuration information to a terminal device, where the measurement configuration information includes at least an absolute radio-frequency channel number of a measurement object and information that is of the measurement object and that is about the one frequency band or the plurality of frequency bands determined by the processing unit 710; and a receiving unit 730, configured to receive a measurement result sent by the terminal device.

It should be understood that the apparatus 700 may correspond to the network device in the measurement method 200 in the embodiments of this application. The apparatus 700 may include units configured to perform the method performed by the network device in the measurement method 200 in FIG. 4. In addition, the units in the apparatus 700 and the foregoing other operations and/or functions are used to implement corresponding procedures of the measurement method 200 in FIG. 4. For a specific process of performing the foregoing corresponding steps by the units, refer to the foregoing description with reference to the method embodiment in FIG. 4. For brevity, details are not described herein.

Optionally, the receiving unit 730 is further configured to: receive information about a frequency band supported by the terminal device.

The processing unit 710 is specifically configured to: determine the one frequency band or the plurality of frequency bands based on the frequency band that is supported by the terminal device and information about which is received by the receiving unit 730 and a frequency band to which a carrier currently deployed by the apparatus belongs.

It should be understood that the apparatus 700 may further correspond to the network device in the measurement method 300 in the embodiments of this application. The apparatus 700 may include units configured to perform the method performed by the network device in the measurement method 300 in FIG. 5. In addition, the units in the apparatus 700 and the foregoing other operations and/or functions are used to implement corresponding procedures of the measurement method 300 in FIG. 5. For a specific process of performing the foregoing corresponding steps by the units, refer to the foregoing description with reference to the method embodiment in FIG. 5. For brevity, details are not described herein.

Optionally, the one frequency band or the plurality of frequency bands is/are an intersection set of the frequency band supported by the terminal device and the frequency band to which the carrier currently deployed by the apparatus belongs.

Optionally, the one frequency band or the plurality of frequency bands is/are a first frequency band, and the first frequency band is a primary frequency band of the apparatus, or the first frequency band is one of extended supported frequency bands of the apparatus.

It should be understood that the apparatus 700 may be a network device, or may be a chip or an apparatus in a network device.

Figure 10:
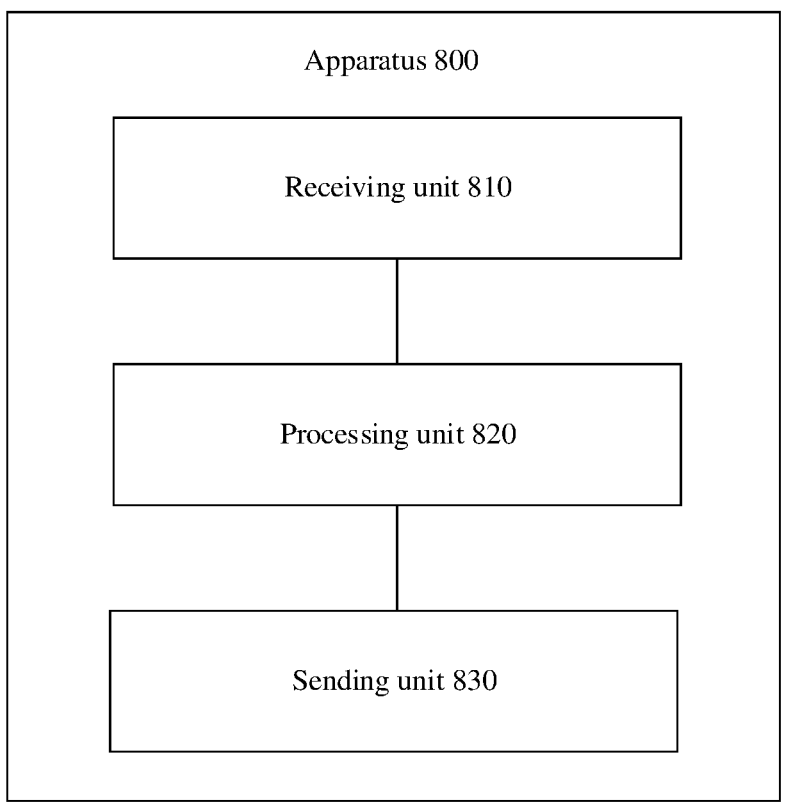
FIG. 10 is still another schematic block diagram of a measurement apparatus according to an embodiment of this application.

FIG. 10 is a schematic block diagram of an apparatus 800 according to an embodiment of this application. As shown in FIG. 10, the apparatus 800 includes: a receiving unit 810, configured to receive measurement configuration information sent by a network device, where the measurement configuration information includes at least an absolute radio-frequency channel number of a measurement object; and a processing unit 820, configured to determine a radio frequency link channel configuration parameter corresponding to each of a plurality of frequency bands, where each of the plurality of frequency bands includes a frequency location corresponding to the absolute radio-frequency channel number received by the receiving unit 810; where the processing unit 820 is further configured to measure, based on the radio frequency link channel configuration parameter corresponding to each of the plurality of frequency bands, the measurement object at a frequency location corresponding to the absolute radio-frequency channel number, to obtain a plurality of measurement results, where each of the plurality of measurement results includes at least information about a frequency band corresponding to the measurement result; and a sending unit 830, configured to send, to the network device, the plurality of measurement results obtained by the processing unit 820 through measurement.

It should be understood that the apparatus 800 may correspond to the terminal device in the measurement method 400 in the embodiments of this application. The apparatus 800 may include units configured to perform the method performed by the terminal device in the measurement method 400 in FIG. 6. In addition, the units in the apparatus 800 and the foregoing other operations and/or functions are used to implement corresponding procedures of the measurement method 400 in FIG. 6. For a specific process of performing the foregoing corresponding steps by the units, refer to the foregoing description with reference to the method embodiment in FIG. 6. For brevity, details are not described herein.

Optionally, the measurement configuration information received by the receiving unit 810 further includes information about the plurality of frequency bands, and the sending unit 830 is further configured to: send information about frequency bands supported by the apparatus to the network device, where the frequency bands supported by the apparatus include the plurality of frequency bands.

It should be understood that the apparatus 800 may further correspond to the terminal device in the measurement method 500 in the embodiments of this application. The apparatus 800 may include units configured to perform the method performed by the terminal device in the measurement method 500 in FIG. 7. In addition, the units in the apparatus 800 and the foregoing other operations and/or functions are used to implement corresponding procedures of the measurement method 500 in FIG. 7. For a specific process of performing the foregoing corresponding steps by the units, refer to the foregoing description with reference to the method embodiment in FIG. 7. For brevity, details are not described herein.

Optionally, the plurality of frequency bands include a primary supported frequency band of the network device and/or an extended supported frequency band of the network device.

It should be understood that the apparatus 800 may be a terminal device, or may be a chip or an apparatus in a terminal device.

Figure 11:
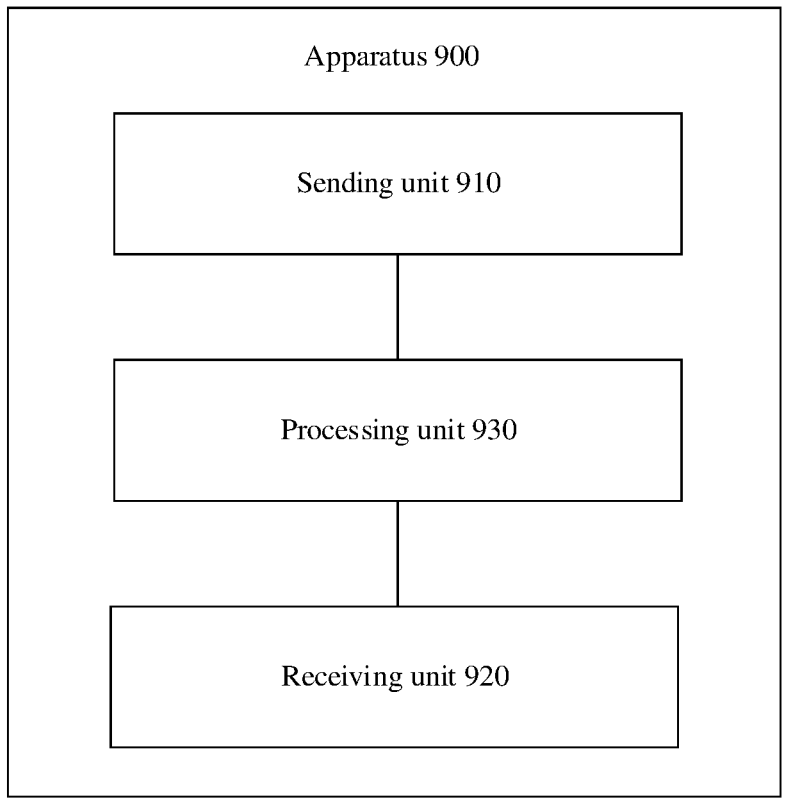
FIG. 11 is yet another schematic block diagram of a measurement apparatus according to an embodiment of this application.

FIG. 11 is a schematic block diagram of an apparatus 900 according to an embodiment of this application. As shown in FIG. 11, the apparatus 900 includes: a sending unit 910, configured to send measurement configuration information to a terminal device, where the measurement configuration information includes at least an absolute radio-frequency channel number of a measurement object; and a receiving unit 920, configured to receive a plurality of measurement results sent by the terminal device, where each of the plurality of measurement results includes at least information about a frequency band corresponding to the measurement result.

Optionally, the apparatus 900 further includes: a processing unit 930, configured to determine, based on the plurality of measurement results, whether to hand over the terminal device.

Optionally, the processing unit 930 is specifically configured to: determine, based on a first measurement result, to hand over the terminal device, where the plurality of measurement results include the first measurement result, and a frequency band corresponding to the first measurement result is a primary supported frequency band of the network device.

The sending unit 910 is further configured to: send a handover command to the terminal device, where the handover command includes information about the primary supported frequency band of the network device.

Optionally, the processing unit 930 is specifically configured to: determine, based on a first measurement result, to hand over the terminal device, where the first measurement result is a best measurement result in the plurality of measurement results.

The sending unit 910 is further configured to: send a handover command to the terminal device, where the handover command includes information about a frequency band corresponding to the first measurement result.

It should be understood that the apparatus 900 may correspond to the network device in the measurement method 400 in the embodiments of this application. The apparatus 900 may include units configured to perform the method performed by the network device in the measurement method 400 in FIG. 6. In addition, the units in the apparatus 900 and the foregoing other operations and/or functions are used to implement corresponding procedures of the measurement method 400 in FIG. 6. For a specific process of performing the foregoing corresponding steps by the units, refer to the foregoing description with reference to the method embodiment in FIG. 6. For brevity, details are not described herein.

Optionally, the measurement configuration information further includes information about a plurality of frequency bands, and the receiving unit 920 is further configured to: when the measurement configuration information further includes the information about the plurality of frequency bands, receive information about a frequency band supported by the terminal device.

The processing unit 930 is further configured to determine the plurality of frequency bands based on the frequency band that is supported by the terminal device and information about which is received by the receiving unit 920 and a frequency band to which a carrier currently deployed by the apparatus belongs.

It should be understood that the apparatus 900 may further correspond to the network device in the measurement method 500 in the embodiments of this application. The apparatus 900 may include units configured to perform the method performed by the network device in the measurement method 500 in FIG. 7. In addition, the units in the apparatus 900 and the foregoing other operations and/or functions are used to implement corresponding procedures of the measurement method 500 in FIG. 7. For a specific process of performing the foregoing corresponding steps by the units, refer to the foregoing description with reference to the method embodiment in FIG. 7. For brevity, details are not described herein.

Optionally, the plurality of frequency bands include the primary supported frequency band of the network device and/or an extended supported frequency band of the network device.

It should be understood that the apparatus 900 may be a network device, or may be a chip or an apparatus in a network device.

Figure 12:
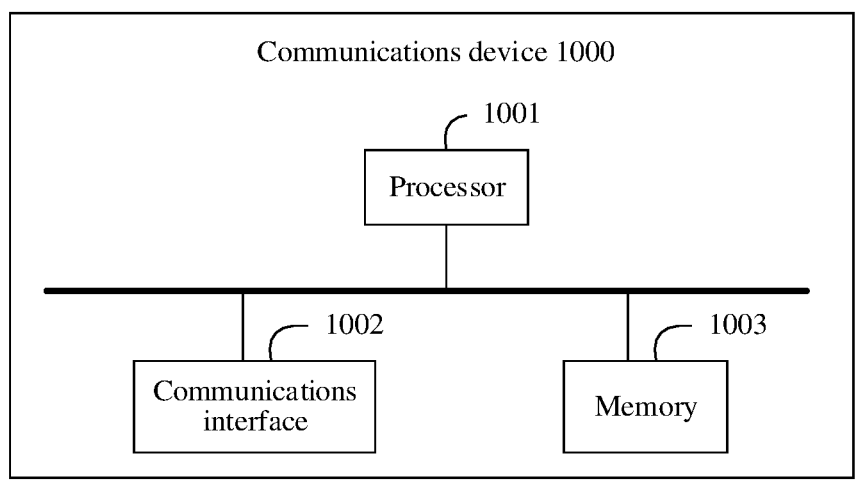
FIG. 12 is a schematic block diagram of a communications device according to an embodiment of this application.

It can be understood that, for the terminal device or the network device in the foregoing embodiments, a program instruction may be executed by a hardware platform having a processor and a communications interface, to implement the functions of the terminal device or the network device in any one of the designs in the foregoing embodiments of this application. Based on this, FIG. 12 is a schematic block diagram of a communications device woo according to an embodiment of this application. The communications device 1000 includes at least one processor 1001.

Optionally, the communications device woo includes a communications interface 1002 and a memory 1003. The communications interface is configured to support the communications device 1000 in communicating and interacting with another device. The memory 1003 has a program instruction. The at least one processor 1001 runs the program instruction, to implement the functions operated on any one of the terminal device or the network device in any one of the designs in the foregoing embodiments of this application. In an optional design, the memory 1003 may be configured to store the program instruction required for implementing the functions of the foregoing device or process data generated in a program execution process. Optionally, the communications device woo may further include an internal interconnection line, to implement communication and interaction between the at least one processor 1001, the communications interface 1002, and the memory 1003. It may be considered that the at least one processor 1001 may be implemented by using a special-purpose processing chip, a processing circuit, a processor, or a general-purpose chip. It may be understood that, the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific applications and design constraints of the technical solutions. For example, in consideration of good universality, low costs, decoupling between software and hardware, and the like, these functions may be implemented by executing the program instruction. For another example, in consideration of system performance, reliability, and the like, these functions may be implemented by using a private circuit. A person of ordinary skill in the art may implement the described functions by using different methods for each particular application. This is not limited herein.

An embodiment of this application further provides a chip system. The chip system includes one or more processors, one or more memories, and an interface circuit. The interface circuit is responsible for information exchange between the chip system and the outside. The one or more memories, the interface circuit, and the one or more processors are interconnected by using a line. The one or more memories store one or more instructions, and the instructions are executed by the one or more processors, to perform operations of the terminal device or the network device corresponding to the foregoing methods.

An embodiment of this application further provides a computer program product, applied to a communications device. The computer program product includes a series of instructions, and when the instructions are run, operations of the terminal device or the network device corresponding to the foregoing methods are performed.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, steps, and logic block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of a hardware module and a software module in a decoding processor. The software module may be located in a mature storage medium in the aft, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM) that is used as an external cache. As an example but not limitative description, many forms of RAMs may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories of the systems and methods described in this specification include but are not limited to these memories and any memory of another proper type.

It should be understood that "one embodiment" or "an embodiment" mentioned in the entire specification means that particular features, structures, or characteristics related to the embodiment are included in one or more embodiments of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining A based on B does not mean that B is determined based on A only; that is, B may also be determined based on A and/or other information.

All or some of the foregoing embodiments may be implemented by using software, hardware, firmware, or any combination thereof. When software is used to implement the embodiments, the embodiments may be implemented entirely or partially in a form of a computer program product. The computer program product may include one or more computer program instructions. When the computer program instructions are loaded and executed on a computer, the procedures or functions according to the embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state disk (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for detailed working processes of the foregoing system, apparatus, and unit, refer to corresponding processes in the foregoing method embodiments, and details are not described herein.

In the several embodiments provided in this application, it should be understood that the disclosed system, apparatus, and method may be implemented in other manners. For example, the described apparatus embodiment is merely an example. For example, division into the units is merely logic function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a terminal device or a chip for the terminal device, the method comprising:
receiving measurement configuration information from a network device, wherein the measurement configuration information comprises an absolute radio-frequency channel number (ARFCN) associated to a measurement object and frequency band information of the measurement object, and the frequency band information of the measurement object indicates a first frequency band in which the measurement object is located; wherein the ARFCN corresponds to an unique frequency in a frequency range including the first frequency band and a second frequency band other than the first frequency band and the first frequency band overlaps with the second frequency band; and
measuring, based on the measurement configuration information, the measurement object according to the first frequency band.

2. The method according to claim 1, wherein the first frequency band is a primary frequency band of the network device, or the first frequency band is an extended supported frequency band of the network device.

3. The method according to claim 1, wherein before receiving the measurement configuration information from the network device, the method further comprises:
sending, to the network device, information about a frequency band supported by the terminal device, wherein the frequency band supported by the terminal device comprises the first frequency band.

4. The method according to claim 1, wherein the measurement configuration information is carried in radio resource control (RRC) signaling.

5. The method according to claim 1, wherein the measurement object is:
a synchronization signal block (SSB); or
a channel state information reference signal (CSI-RS); or
a synchronization signal block (SSB) and a channel state information reference signal (CSI-RS).

6. The method according to claim 1, further comprising:
sending a measurement result of the measurement object to the network device, wherein the measurement result comprises one or more of a signal-to-interference-plus-noise ratio (SINR) of the measurement object, reference signal received power (RSRP) of the measurement object, reference signal received quality (RSRQ) of the measurement object, or a received signal strength indicator (RSSI) of the measurement object.

7. The method according to claim 1, wherein the ARFCN corresponds to a same frequency in the first frequency band and the second frequency band.

8. An apparatus, comprising:
one or more processors, wherein the one or more processors are coupled to one or more memories, the one or more processors are configured to execute a program stored in the one or more memories, the program comprises one or more program instructions, and execution of the program causes the apparatus to:
receive measurement configuration information from a network device, wherein the measurement configuration information comprises an absolute radio-frequency channel number (ARFCN) associated to a measurement object and frequency band information of the measurement object, and the frequency band information of the measurement object indicates a first frequency band in which the measurement object is located, and wherein the ARFCN corresponds to an unique frequency in a frequency range including the first frequency band and a second frequency band other than the first frequency band and the first frequency band overlaps with the second frequency band; and
measure, based on the measurement configuration information, the measurement object according to the first frequency band.

9. The apparatus according to claim 8, wherein the first frequency band is a primary frequency band of the network device, or the first frequency band is an extended supported frequency band of the network device.

10. The apparatus according to claim 8, wherein execution of the program further causes the apparatus to:
before receiving the measurement configuration information from the network device, send, to the network device, information about a frequency band supported by a terminal device which the apparatus is or is used for, wherein the frequency band supported by the terminal device comprises the first frequency band.

11. The apparatus according to claim 8, wherein the measurement configuration information is carried in radio resource control (RRC) signaling.

12. The apparatus according to claim 8, wherein the measurement object is:
a synchronization signal block (SSB); or
a channel state information reference signal (CSI-RS); or
a synchronization signal block (SSB) and a channel state information reference signal (CSI-RS).

13. The apparatus according to claim 8, wherein execution of the program further causes the apparatus to send a measurement result of the measurement object to the network device, and wherein the measurement result comprises one or more of a signal-to-interference-plus-noise ratio (SINR) of the measurement object, reference signal received power (RSRP) of the measurement object, reference signal received quality (RSRQ) of the measurement object, or a received signal strength indicator (RSSI) of the measurement object.

14. The apparatus according to claim 8, wherein the ARFCN corresponds to a same frequency in the first frequency band and the second frequency band.

15. A method, performed by a network device or a chip for the network device, the method comprising:
sending measurement configuration information to a terminal device, wherein the measurement configuration information comprises an absolute radio-frequency channel number (ARFCN) associated to a measurement object and frequency band information of the measurement object, and the frequency band information of the measurement object indicates a first frequency band in which the measurement object is located, and wherein the ARFCN corresponds to an unique frequency in a frequency range including the first frequency band and a second frequency band other than the first frequency band and the first frequency band overlaps with the second frequency band; and
receiving a measurement result from the terminal device, wherein the measurement result based on the measurement configuration information.

16. The method according to claim 15, the method further comprising:
receiving information about a frequency band supported by the terminal device; and
determining the first frequency band based on the frequency band supported by the terminal device and a frequency band to which a carrier currently deployed by the network device belongs.

17. The method according to claim 15, wherein the ARFCN corresponds to a same frequency in the first frequency band and the second frequency band.

18. The method according to claim 15, wherein the measurement configuration information is sent in radio resource control (RRC) signaling.

19. An apparatus, comprising:
one or more processors, wherein the one or more processors are coupled to one or more memories, the one or more processors are configured to execute a program stored in the one or more memories, the program comprises one or more program instructions, and execution of the program causes the apparatus to:
send measurement configuration information to a terminal device, wherein the measurement configuration information comprises an absolute radio-frequency channel number (ARFCN) associated to a measurement object and frequency band information of the measurement object, and the frequency band information of the measurement object indicates a first frequency band in which the measurement object is located, and wherein the ARFCN corresponds to an unique frequency in a frequency range including the first frequency band and a second frequency band other than the first frequency band and the first frequency band overlaps with the second frequency band; and receive a measurement result from the terminal device, the measurement result based on the measurement configuration information.

20. The apparatus according to claim 19, wherein execution of the program further causes the apparatus to:

receive information about a frequency band supported by the terminal device; and determine the first frequency band based on the frequency band supported by the terminal device and a frequency band to which a carrier currently deployed by a network device which the apparatus is or is used for belongs.

21. The apparatus according to claim 19, wherein the measurement configuration information is sent in radio resource control (RRC) signaling.

22. The apparatus according to claim 19, wherein the measurement object is:

a synchronization signal block (SSB); or a channel state information reference signal (CSI-RS); or a synchronization signal block (SSB) and a channel state information reference signal (CSI-RS).

* * * * *

UNITED STATES PATENT AND TRADEMARK OFFICE
CERTIFICATE OF CORRECTION

PATENT NO. : 12,075,273 B2
APPLICATION NO. : 17/133931
DATED : August 27, 2024
INVENTOR(S) : Zhang et al.

It is certified that error appears in the above-identified patent and that said Letters Patent is hereby corrected as shown below:

In the Specification

In Column 10, Line 26, delete "RAN no" and insert -- RAN 110 --.

In Column 10, Line 27, delete "RAN no" and insert -- RAN 110 --.

In Column 29, Line 8, delete "woo" and insert -- 1000 --.

In Column 29, Line 11, delete "woo" and insert -- 1000 --.

In Column 29, Line 24, delete "woo" and insert -- 1000 --.

Signed and Sealed this
First Day of October, 2024

Katherine Kelly Vidal
*Director of the United States Patent and Trademark Office*